United States Patent
Jung et al.

(10) Patent No.: US 8,117,654 B2
(45) Date of Patent: Feb. 14, 2012

(54) IMPLEMENTATION OF MALWARE COUNTERMEASURES IN A NETWORK DEVICE

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
William Henry Mangione-Smith, Kirkland, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 330 days.

(21) Appl. No.: 11/480,819

(22) Filed: Jun. 30, 2006

(65) Prior Publication Data

US 2008/0005124 A1 Jan. 3, 2008

Related U.S. Application Data

(63) Continuation-in-part of application No. 11/480,782, filed on Jun. 30, 2006.

(51) Int. Cl.
*G06F 12/14* (2006.01)
*G06F 7/04* (2006.01)
*G06F 11/30* (2006.01)

(52) U.S. Cl. .............. 726/22; 713/188; 726/26

(58) Field of Classification Search ............ 726/26, 726/22; 713/188
See application file for complete search history.

(56) References Cited

U.S. PATENT DOCUMENTS

| | | | |
|---|---|---|---|
| 5,416,842 A | 5/1995 | Aziz | |
| 5,918,008 A * | 6/1999 | Togawa et al. ............... | 726/24 |
| 6,304,556 B1 | 10/2001 | Haas | |
| 6,594,624 B1 | 7/2003 | Curet | |
| 7,093,293 B1 | 8/2006 | Smithson et al. | |
| 7,188,173 B2 * | 3/2007 | Anderson et al. ............. | 709/225 |
| 7,287,278 B2 | 10/2007 | Liang | |
| 7,389,537 B1 * | 6/2008 | Callon et al. .................. | 726/22 |
| 7,571,483 B1 * | 8/2009 | Bascle et al. .................. | 726/24 |
| 2002/0161918 A1 | 10/2002 | Asano et al. | |
| 2003/0018725 A1 * | 1/2003 | Turner et al. ................ | 709/206 |
| 2003/0110395 A1 * | 6/2003 | Presotto et al. .............. | 713/201 |
| 2003/0195861 A1 * | 10/2003 | McClure et al. .................. | 707/1 |
| 2003/0233567 A1 | 12/2003 | Lynn et al. | |
| 2004/0005873 A1 * | 1/2004 | Groenendaal et al. ........ | 455/410 |
| 2004/0098482 A1 * | 5/2004 | Asano ........................... | 709/225 |
| 2004/0218615 A1 | 11/2004 | Griffin et al. | |
| 2004/0268079 A1 * | 12/2004 | Riedle et al. .................. | 711/173 |
| 2005/0022028 A1 | 1/2005 | Hall | |
| 2005/0050378 A1 | 3/2005 | Liang | |
| 2005/0086499 A1 | 4/2005 | Hoefelmeyer et al. | |

(Continued)

OTHER PUBLICATIONS

"Category: Network Monitoring"; Securityfocus.com; bearing a date of 2005; printed on Jun. 7, 2006; pp. 1-4; Security Focus; located at http://www.securityfocus.com/cgi-bin/index.cgi?o=10&1=10&c=33.

(Continued)

*Primary Examiner* — Michael Pyzocha

(57) ABSTRACT

Embodiments include a system, an apparatus, a device, and a method. An embodiment provides a network device. The network device includes an information store operable to save a countermeasure useable in at least substantially reducing a harm caused by a malware (hereafter the "malware countermeasure"). The network device also includes a transmission circuit for sending a packet to at least one sub-network of a plurality of sub-networks. The network device also includes a protection circuit for implementing the malware countermeasure in the network device.

42 Claims, 18 Drawing Sheets

U.S. PATENT DOCUMENTS

| | | | |
|---|---|---|---|
| 2005/0091538 A1 | 4/2005 | Hoche et al. | |
| 2005/0120231 A1 | 6/2005 | Harada et al. | |
| 2005/0187740 A1* | 8/2005 | Marinescu | 703/1 |
| 2005/0193430 A1 | 9/2005 | Cohen et al. | |
| 2005/0198519 A1 | 9/2005 | Tamura et al. | |
| 2005/0201299 A1 | 9/2005 | Radi et al. | |
| 2005/0273850 A1 | 12/2005 | Freund | |
| 2005/0289649 A1 | 12/2005 | Mitomo et al. | |
| 2006/0031940 A1 | 2/2006 | Rozman et al. | |
| 2006/0048228 A1 | 3/2006 | Takemori et al. | |
| 2006/0101517 A1 | 5/2006 | Banzhof et al. | |
| 2006/0123479 A1 | 6/2006 | Kumar et al. | |
| 2006/0236393 A1* | 10/2006 | Kramer et al. | 726/23 |
| 2006/0272025 A1* | 11/2006 | Mononen | 726/26 |
| 2007/0002838 A1 | 1/2007 | Komura et al. | |
| 2007/0011741 A1 | 1/2007 | Robert et al. | |
| 2007/0011743 A1 | 1/2007 | Krishnamurthy | |
| 2007/0064617 A1 | 3/2007 | Reves | |
| 2007/0074019 A1 | 3/2007 | Seidel | |
| 2007/0101422 A1* | 5/2007 | Carpenter | 726/13 |
| 2007/0250931 A1 | 10/2007 | Takahashi | |
| 2007/0294759 A1 | 12/2007 | Browne | |
| 2008/0005784 A1 | 1/2008 | Miliefsky | |

OTHER PUBLICATIONS

Cavedon, Lawrence; "CS320: Introduction to Artificial Intelligence, Introduction to CLIPS"; Goanna.cs.rmit.edu.au; bearing dates of 1996 and May 5, 1997; printed on Jun. 15, 2006; pp. 1-8; Royal Melbourne Institution of Technology; located at http://goanna.cs.rmit.edu.au/~cavedon/courses/320/labs/clips.html.

Chen, Li-Chiou; Carley, Kathleen M.; "The Impact of Network Topology on the Spread of Anti-Virus Countermeasures"; printed on Jun. 8, 2006; pp. 1-4.

"CommView®, Overview"; Tamos.com; bearing a date of 1996-2006; printed on Jun. 14, 2006; pp. 1-2; Tamosoft; located at http://www.tamos.com/products/commview/.

"Computer networking device"; Wikipedia; bearing a date of Jun. 5, 2006; printed on Jun. 13, 2006; pp. 1-2; Wikimedia Foundation, Inc.; located at http://en.wikipedia.org/wiki/Computer_networking_device.

"Ethical Hacking and Countermeasures"; Eccocouncil.org; bearing a date of 2002; printed on Jun. 15, 2006; pp. 1-30; EC-Council; located at http://www.eccouncil.org/EC-Council%20Education/ceg-ciyrse-outline.htm.

Keromytis, Angelos D.; "Patch on Demand Saves Even More Time"; Cs.columbia.edu;bearing a date of Aug. 2004; printed on Jun. 20, 2006; pp. 94-96; located at http://www1.cs.columbia.edu/~angelos/Papers/r8094.pdf.

"McAfee® Glossary"; McAfee.com;printed on Jun. 6, 2006; pp. 1-2; located at http://www.mcafee.com/us/threat_center/glossary.html#v.

"Network Monitor—Track4Win helps you to monitor network and all computers."; Track4win.com; bearing a date of 2000-2006; printed on Jun. 7, 2006; pp. 1-2; Sepama Software; located at http://www.track4win.com/Network_Monitor.asp.

"Network probe"; Objectplanet.com; bearing dates of Mar. 14, 2006 and 2006; printed on Jun. 7, 2006; pp. 1-4; ObjectPlanet, Inc.; Oslo, Norway; located at http://www.objectplanet.com/probe/.

"Networking Hardware": Wikipedia; bearing a date of May 31, 2006; printed on Jun. 13, 2006; pp. 1-1; Wikimedia Foundation, Inc.; located at: http://en.wikipedia.org/wiki/Networking_hardware.

Staniford, Stuart; Paxson, Vern; Weaver, Nicholas; "How to Own the Internet in Your Spare Time"; Proceedings of the 11$^{th}$ Usenix Security Symposium (Security '02); printed on Jun. 5, 2006; pp. 1-20; located at: http://www.icir.org/vern/papers/cdc-unsenix-sec02/.

"Symantec Glossary"; Symantec.com; printed on Jun. 6, 2006; pp. 1-2; located at: http://securityresponse.symantec.com/avcenter/refa.html#worm.

"Symantec Glossary"; Symantec.com; printed on Jun. 6, 2006; pp. 1-3; located at: http://securityresponse.symantec.com/avcenter/refa.html#worm.

"W32/Kelvir.worm.bh"; McAfee; bearing dates of 2003-2005, May 21, 2005, May 23, 2005 and May 8, 2006; printed on Jun. 6, 2006; pp. 1-5; McAfee, Inc.; located at: http://vil.nai.com/vil/content/v_133908.htm.

Weaver, Nicholas; Staniford, Stuart; Paxson, Vern; "Very Fast Containment of Scanning Worms"; Proceedings of the 13$^{th}$ USENIX Security Symposium; bearing dates of 2004 and Aug. 9-13, 2004; printed on Jun. 7, 2006; pp. 1-17; The USENIX Association; located at: www.usenix.org/publications/library/proceedings/sec04/tech/weaver.html.

"What is the difference between viruses, worms, and Trojans?"; Symantec.com; bearing dates of 1995-2006, Apr. 12, 1999 and Mar. 30, 2005; pp. 1-4; Symantec Corporation; located at: http://service1.symantec.com/SUPPORT/nav.nsf/aab56492973adcc8825694500552355/024c927836400f528825675100593eb2?OpenDocument&src=sec web nam.

Zou, Cliff C.; Towsley, Don; Gong, Weibo; Cai, Songlin; "Routing Worm: A Fast, Selective Attack Worm based on IP Address Information"; printed on Jun. 19, 2006; pp. 1-17; Technical Report: TR-03CSE-06; located at http://citeseer.ist.psu.edu/cache/papers/cs2/48/http:zSzzSztennis.ecs.umass.eduzSz~czouzSzresearchzSzroutingWorm-techreport.pdf/zou05routing.pdf.

PCT International Search Report; International App. No. PCT/US07/15209; Sep. 9, 2008; pp. 1-2.

Chinese Patent Office official action; App. No. 200780015273.1 based on PCT/US07/010140; Aug. 24, 2010 (received [by our agent] on Sep. 10, 2010); pp. 1-6. (No Translation Currently Available).

U.S. Appl. No. 11/487,595, filed Nov. 1, 2007, Jung et al.
U.S. Appl. No. 11/486,975, filed Nov. 1, 2007, Jung et al.
U.S. Appl. No. 11/480,782, filed Jan. 3, 2008, Jung et al.

* cited by examiner

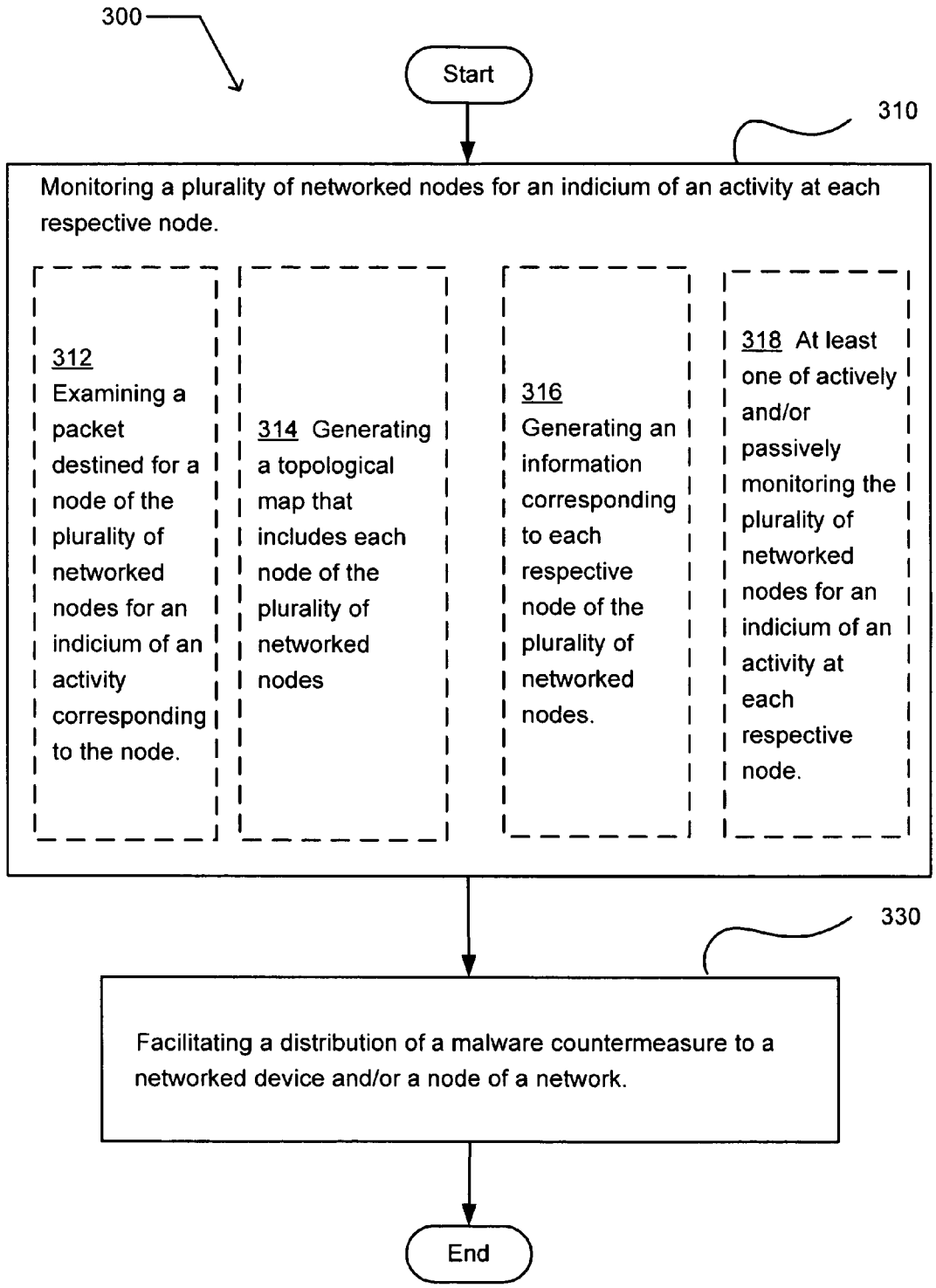

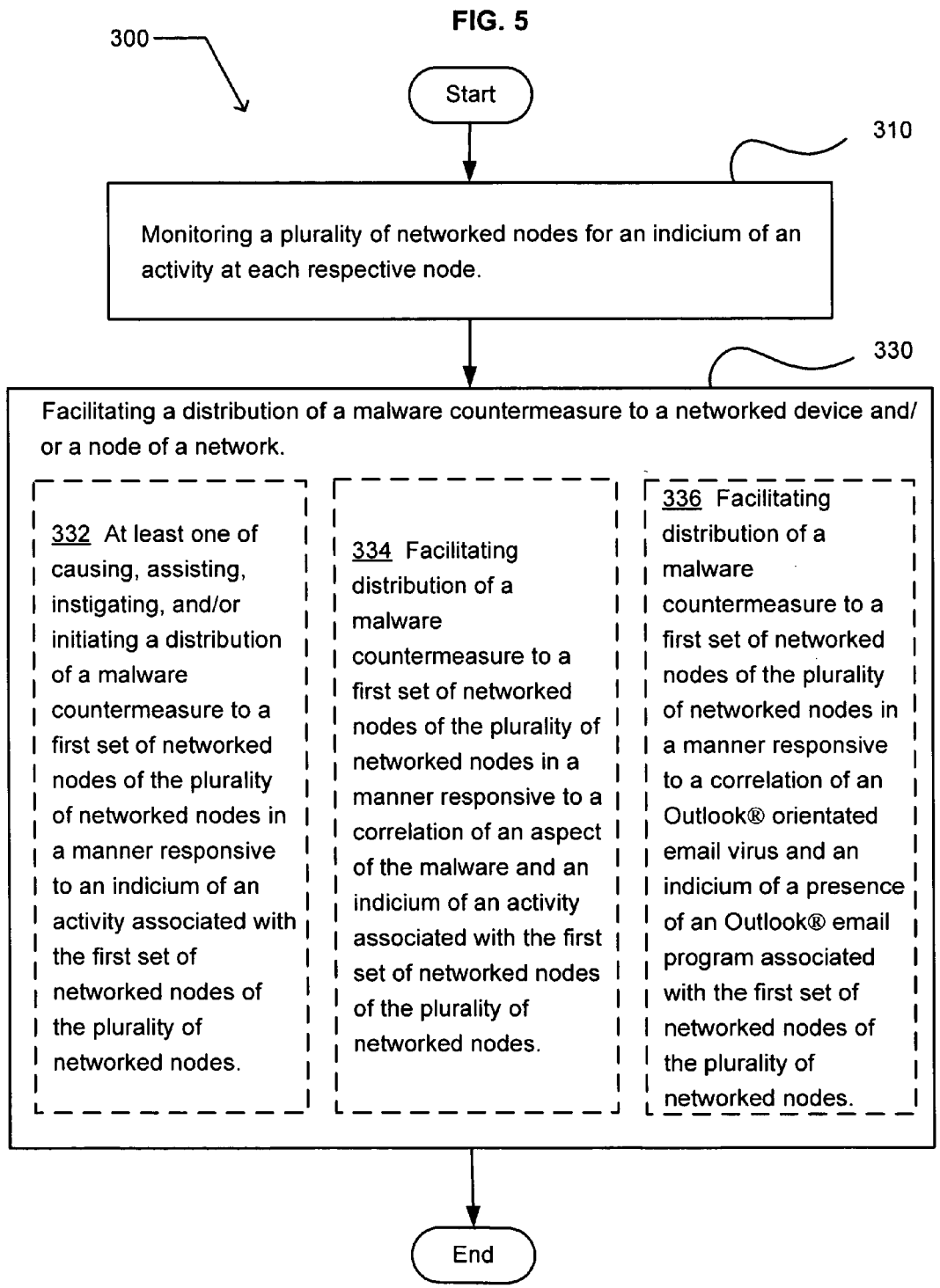

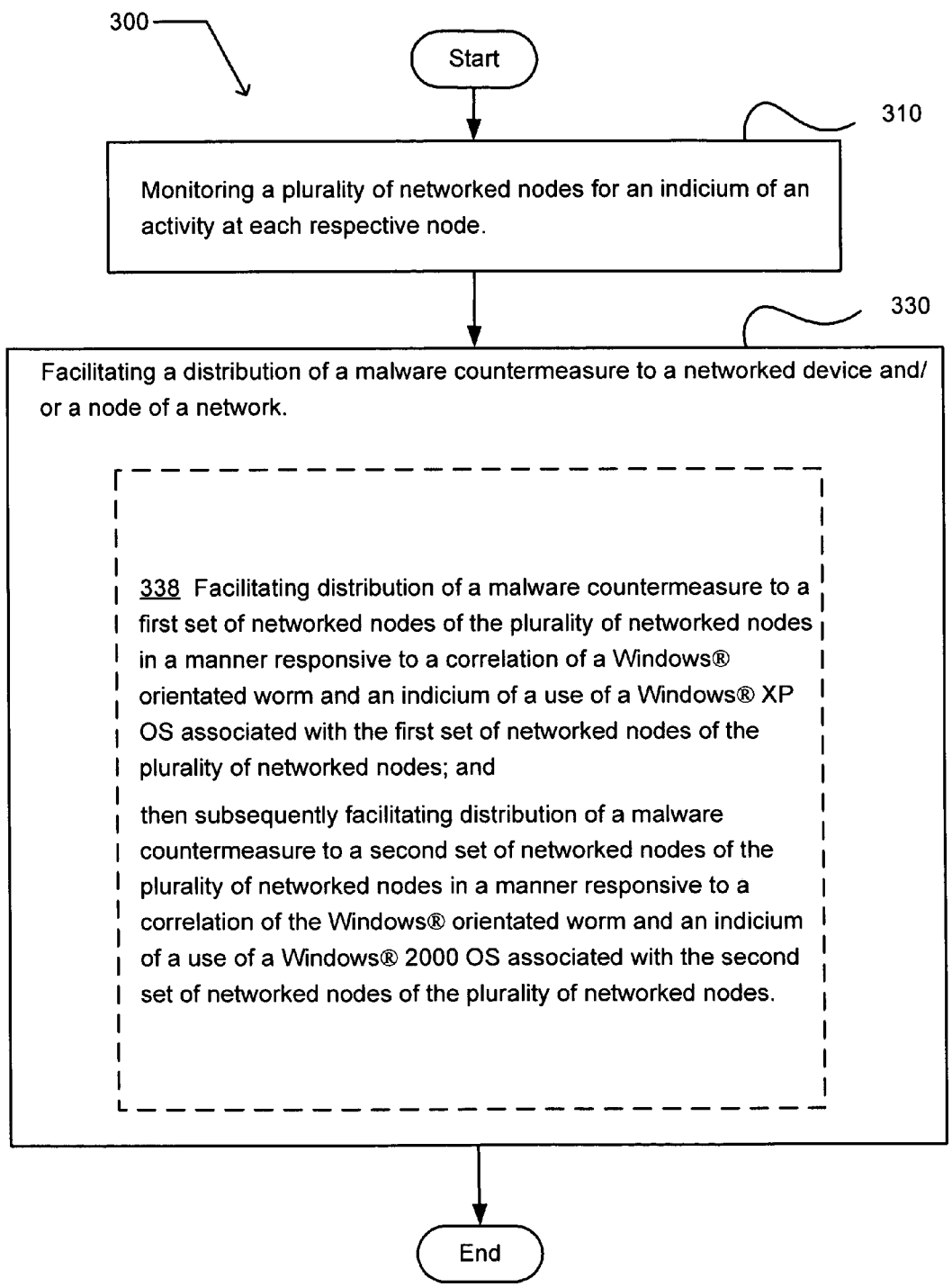

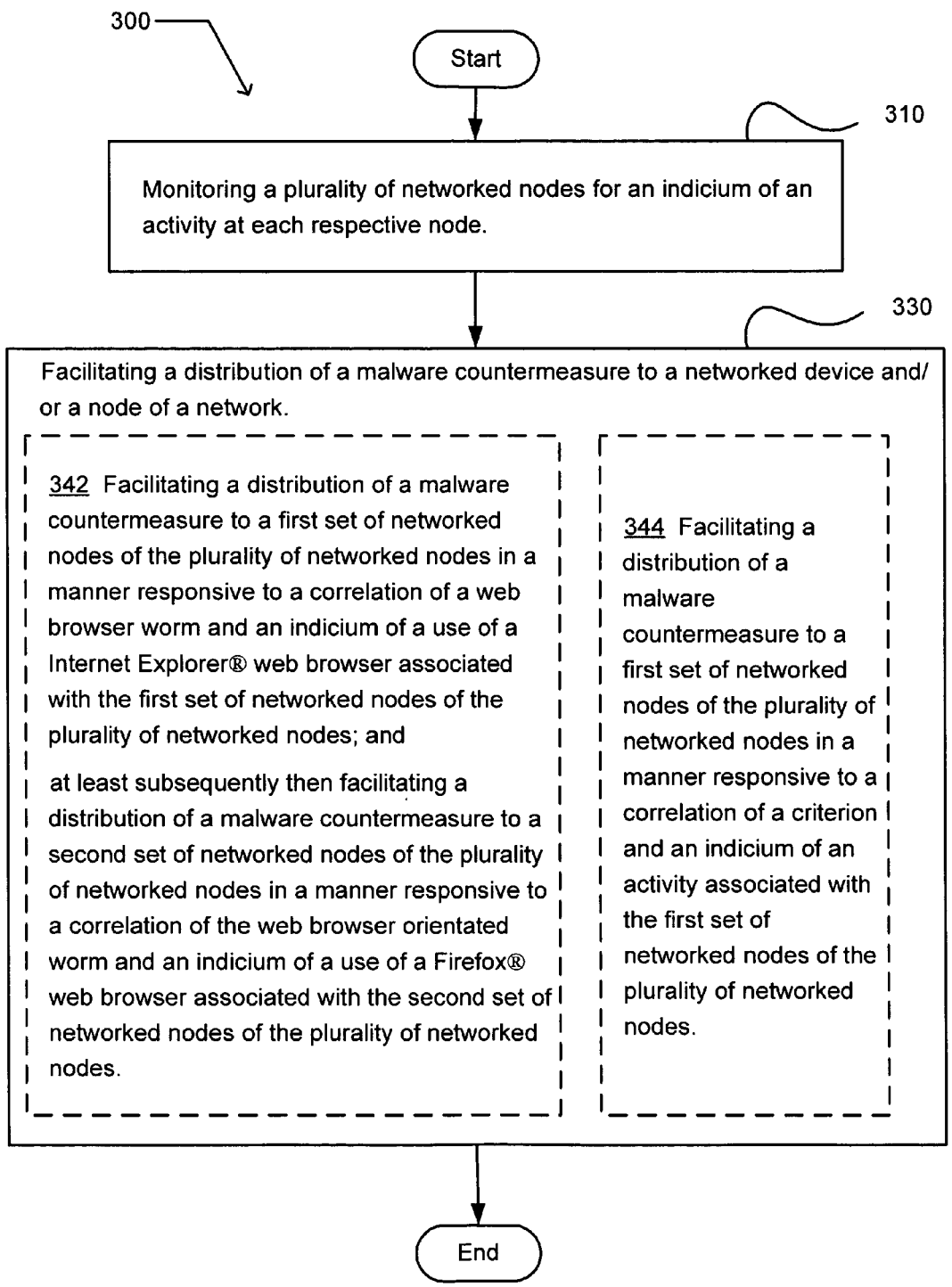

FIG. 8

405 A computer-readable signal-bearing medium bearing the program instructions.

410 Program instructions operable to perform a process in a computing device, the process comprising:

monitor a plurality of networked nodes for an indicium of an activity at each respective node; and facilitate a distribution of a malware countermeasure to a first set of networked nodes of the plurality of networked nodes in a manner responsive to an indicium of an activity associated with the first set of networked nodes of the plurality of networked nodes.

412 facilitate a distribution of a malware countermeasure to a first set of networked nodes of the plurality of networked nodes in a manner responsive to correlation between a criterion and an indicium of an activity associated with the first set of networked nodes of the plurality of networked nodes.

422 The computer-readable signal-bearing medium includes a computer storage medium.

424 The computer-readable signal-bearing medium includes a communication medium.

1005 A computer-readable signal-bearing medium bearing the program instructions.

1010 Program instructions operable to perform a process in a computing device, the process comprising:

saving a countermeasure useable in at least substantially reducing a harm presented by a malware (hereafter the "malware countermeasure") to a networked device and/or a node of a network;

determining if a criterion for implementation of the malware countermeasure is met; and implementing the malware countermeasure in the computing device if the criterion is met for implementation of the malware countermeasure

1022 The computer-readable signal-bearing medium includes a computer storage medium.

1024 The computer-readable signal-bearing medium includes a communication medium.

IMPLEMENTATION OF MALWARE COUNTERMEASURES IN A NETWORK DEVICE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States patent application entitled SMART DISTRIBUTION OF A MALWARE COUNTERMEASURE, naming Edward K. Y. Jung; Royce A. Levien; Robert W. Lord; Mark A. Malamud; and William Henry Mangione-Smith as inventors, U.S. application Ser. No. 11/480,782, filed Jun. 30, 2006.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a network device. The network device includes a network analyzer module operable to monitor a plurality of networked nodes for an indicium of an activity at each respective node. The network device includes a dissemination module operable to facilitate distribution of a malware countermeasure to a first set of networked nodes of the plurality of networked nodes in a manner responsive to an indicium of an activity associated with the first set of networked nodes of the plurality of networked nodes. The network device may include a communications module operable to send packets to at least one node of the plurality of networked nodes. In addition to the foregoing, other device embodiments are described in the claims, drawings, and text forming a part of the present application.

Another embodiment provides a method. The method includes monitoring a plurality of networked nodes for an indicium of an activity at each respective node. The method also includes facilitating a distribution of a countermeasure to a first set of networked nodes of the plurality of networked nodes in a manner responsive to an indicium of an activity associated with the first set of networked nodes of the plurality of networked nodes, the countermeasure useable in at least substantially reducing a harm presented by a malware (hereafter the "malware countermeasure") to a networked device and/or a node of a network. In addition to the foregoing, other method embodiments are described in the claims, drawings, and text forming a part of the present application.

A further embodiment provides a computer-program product. The computer-program product includes program instructions operable to perform a process in a computing device. The process includes monitor a plurality of networked nodes for an indicium of an activity at each respective node. The process also includes facilitate a distribution of a malware countermeasure to a first set of networked nodes of the plurality of networked nodes in a manner responsive to an indicium of an activity associated with the first set of networked nodes of the plurality of networked nodes. The computer-program product also includes a computer-readable signal-bearing medium bearing the program instructions. In addition to the foregoing, other computer-program product embodiments are described in the claims, drawings, and text forming a part of the present application.

An embodiment provides a network device. The network device includes means for monitoring a plurality of networked nodes for an indicium of an activity at each respective node. The network device also includes means for facilitating distribution of a malware countermeasure to a first set of networked nodes of the plurality of networked nodes in a manner responsive to an indicium of an activity associated with the first set of networked nodes of the plurality of networked nodes. The network device may include means for generating the malware countermeasure. In addition to the foregoing, other network device embodiments are described in the claims, drawings, and text forming a part of the present application.

Another embodiment provides active network device. The active network device includes a communications module operable to facilitate a movement of packets to at least one node of a plurality of networked nodes. The active network device also includes a network analyzer module operable to monitor each respective node of the plurality of networked nodes for an indicium of an activity. The active network device further includes a dissemination module operable to distribute a malware countermeasure to a first set of nodes of the plurality of networked nodes in a manner responsive to the indicium of an activity corresponding to the first set of networked nodes of the plurality of networked nodes. In addition to the foregoing, other active network device embodiments are described in the claims, drawings, and text forming a part of the present application.

A further embodiment provides a network device. The network device includes an information store operable to save a countermeasure useable in at least substantially reducing a harm caused by a malware (hereafter the "malware countermeasure"). The network device also includes a transmission circuit for sending a packet to at least one sub-network of a plurality of sub-networks. The network device further includes a protection circuit for implementing the malware countermeasure in the network device. The network device may include a processor. The network device may include a decision circuit for determining if a criterion is met for implementation of the malware countermeasure. The network device may include a countermeasure engine operable to generate the malware countermeasure. In addition to the foregoing, other network device embodiments are described in the claims, drawings, and text forming a part of the present application.

An embodiment provides a method implemented in a computing device operable to facilitate communication of a packet to at least one sub-network of a plurality of sub-networks. The method includes saving a countermeasure useable in at least substantially reducing a harm caused by a malware (hereafter the "malware countermeasure"). The method also includes determining if a criterion is met for implementation of the malware countermeasure. The method further includes implementing the malware countermeasure in the computing device if the criterion is met for implementation of the malware countermeasure. In addition to the foregoing, other method embodiments are described in the claims, drawings, and text forming a part of the present application.

Another embodiment provides a network device. The network device includes means for facilitating communication of a packet to at least one sub-network of a plurality of sub-networks. The network device also includes means for saving a countermeasure useable in at least substantially reducing a harm caused by a malware (hereafter the "malware countermeasure"). The network device further includes means for determining if a criterion is met for implementation of the malware countermeasure. The network device further includes means for implementing the malware countermeasure in the network device if the criterion for implementation of the malware countermeasure is met. In addition to the foregoing, other network device embodiments are described in the claims, drawings, and text forming a part of the present application.

A further embodiment provides a computer-program product. The computer-program product includes a computer-readable signal-bearing medium bearing the program instructions. The computer-program product also includes program instructions operable to perform a process in a computing device. The process includes saving a countermeasure useable in at least substantially reducing a harm presented by a malware to a networked device and/or a node of a network (hereafter the "malware countermeasure"). The process also includes determining if a criterion for implementation of the malware countermeasure is met. The process further includes implementing the malware countermeasure in the computing device if the criterion is met for implementation of the malware countermeasure. In addition to the foregoing, other computer-program product embodiments are described in the claims, drawings, and text forming a part of the present application.

An embodiment provides a network device. The network device includes an information store configurable by a countermeasure useable in at least substantially reducing a harm caused by a malware (hereafter a "malware countermeasure"). The network device also includes a decision circuit for determining if a criterion for implementation of a malware countermeasure is met. The network device further includes a defender circuit for applying a malware countermeasure to the network device if the criterion for implementation of a malware countermeasure is met. In addition to the foregoing, other network device embodiments are described in the claims, drawings, and text forming a part of the present application.

Another embodiment provides a method. The method includes configuring an information store of a network device with a countermeasure useable in at least substantially reducing a harm caused by a malware (hereafter a "malware countermeasure"). The method also includes determining if a criterion for implementation of a malware countermeasure is met. The method further includes applying a malware countermeasure to the network device if the criterion for implementation of a malware countermeasure is met. In addition to the foregoing, other method embodiments are described in the claims, drawings, and text forming a part of the present application.

A further embodiment provides a network device. The network device includes means for configuring an information store with a countermeasure useable in at least substantially reducing a harm caused by a malware (hereafter a "malware countermeasure"). The network device also includes means for determining if a criterion for implementation of a malware countermeasure is met. The network device further includes means for applying a malware countermeasure to the network device if the criterion for implementation of a malware countermeasure is met. In addition to the foregoing, other network device embodiments are described in the claims, drawings, and text forming a part of the present application.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 4 illustrates an alternative embodiment of the operational flow of FIG. 3;

FIG. 5 illustrates a further alternative embodiment of the operational flow of FIG. 3;

FIG. 6 illustrates another alternative embodiment of the operational flow of FIG. 3;

FIG. 7 illustrates a further embodiment of the operational flow of FIG. 3;

FIG. 8 illustrates an exemplary computer-program product;

FIG. 15 illustrates an exemplary computer-program product;

DETAILED DESCRIPTION

Figure 1:
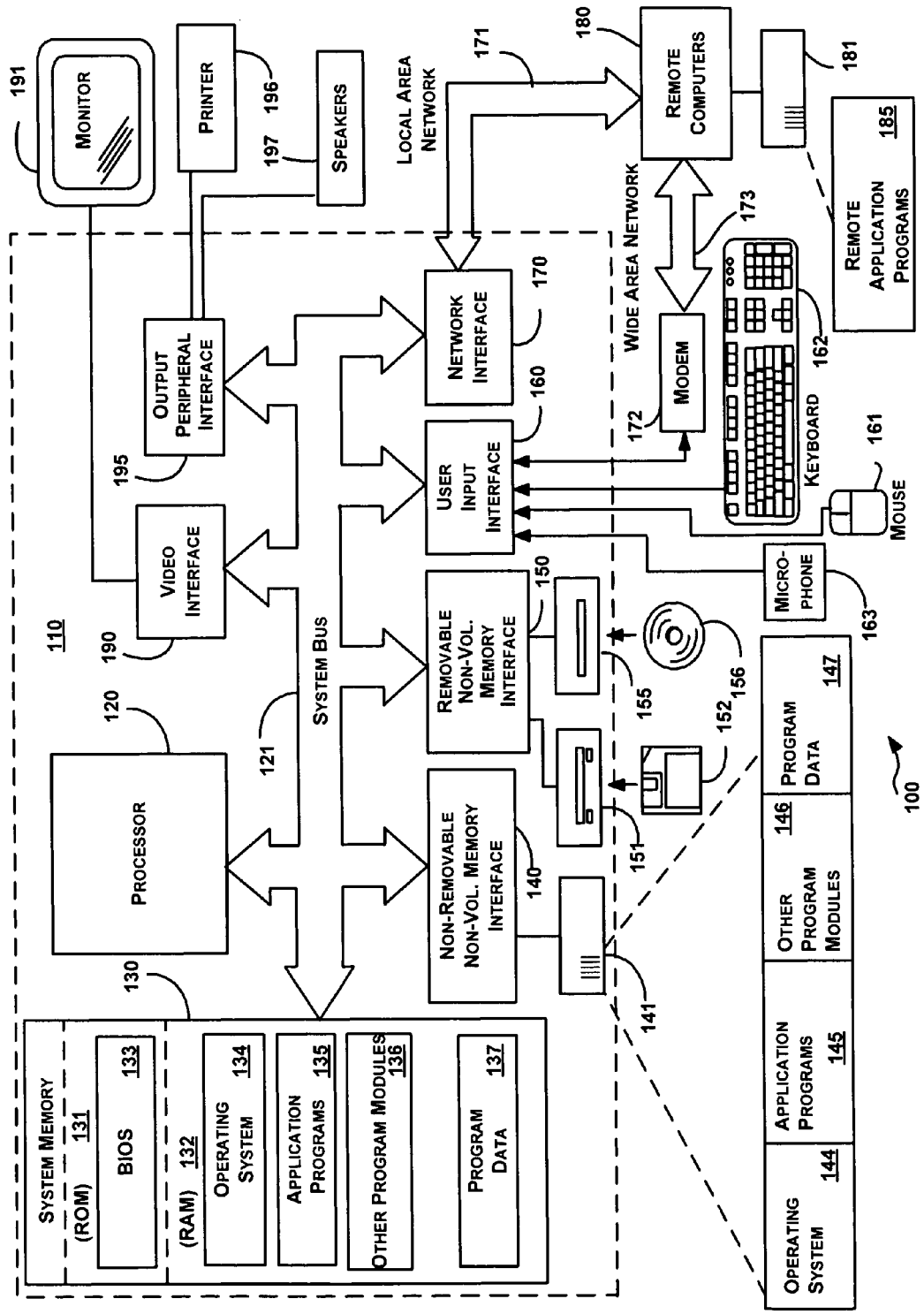
FIG. 1 illustrates an exemplary general-purpose computing system in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an exemplary general-purpose computing system in which embodiments may be implemented, shown as a computing system environment 100. Components of the computing system environment 100 may include, but are not limited to, a computing device 110 having a processor 120, a system memory 130, and a system bus 121 that couples various system components including the system memory to the processor 120. By way of example, the processor may include a microprocessor, a central processing unit (CPU), and/or multi-core processor. The system bus 121 may be any of several types of bus structures including a memory bus or memory controller, a peripheral bus, and a local bus using any of a variety of bus architectures. Such architectures may include at least one Industry Standard Architecture (ISA) bus, Micro Channel Architecture (MCA) bus, Enhanced ISA (EISA) bus, Video Electronics Standards Association (VESA) local bus, and/or Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media may include volatile and nonvolatile, removable and non-removable media implemented in any method or technology for storage of information such as computer-readable instructions, data structures, program modules, or other data. Computer storage media may include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. Communications media may include a wired media, such as a wired network and/or a direct-wired connection, and/or a wireless media, such as acoustic, RF, optical, and infrared media. Combinations of any of the above may also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processor 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's WINDOWS® are well known in the art.

In an embodiment, an information store may include a computer storage media. In a further embodiment, an information store may include a group of digital information storage devices. In another embodiment, an information store may include a quantum memory device.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/non-volatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141, is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on computer storage medium 181. It will be appreciated that the network connections shown are exemplary and other means of establishing a communications link between the computers may be used.

FIG. 1 is intended to provide a brief, general description of an illustrative and/or suitable exemplary environment in which embodiments may be implemented. An exemplary system may include the computing system environment 100 of FIG. 1. FIG. 1 is an example of a suitable environment and is not intended to suggest any limitation as to the structure, scope of use, or functionality of an embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing device 110 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
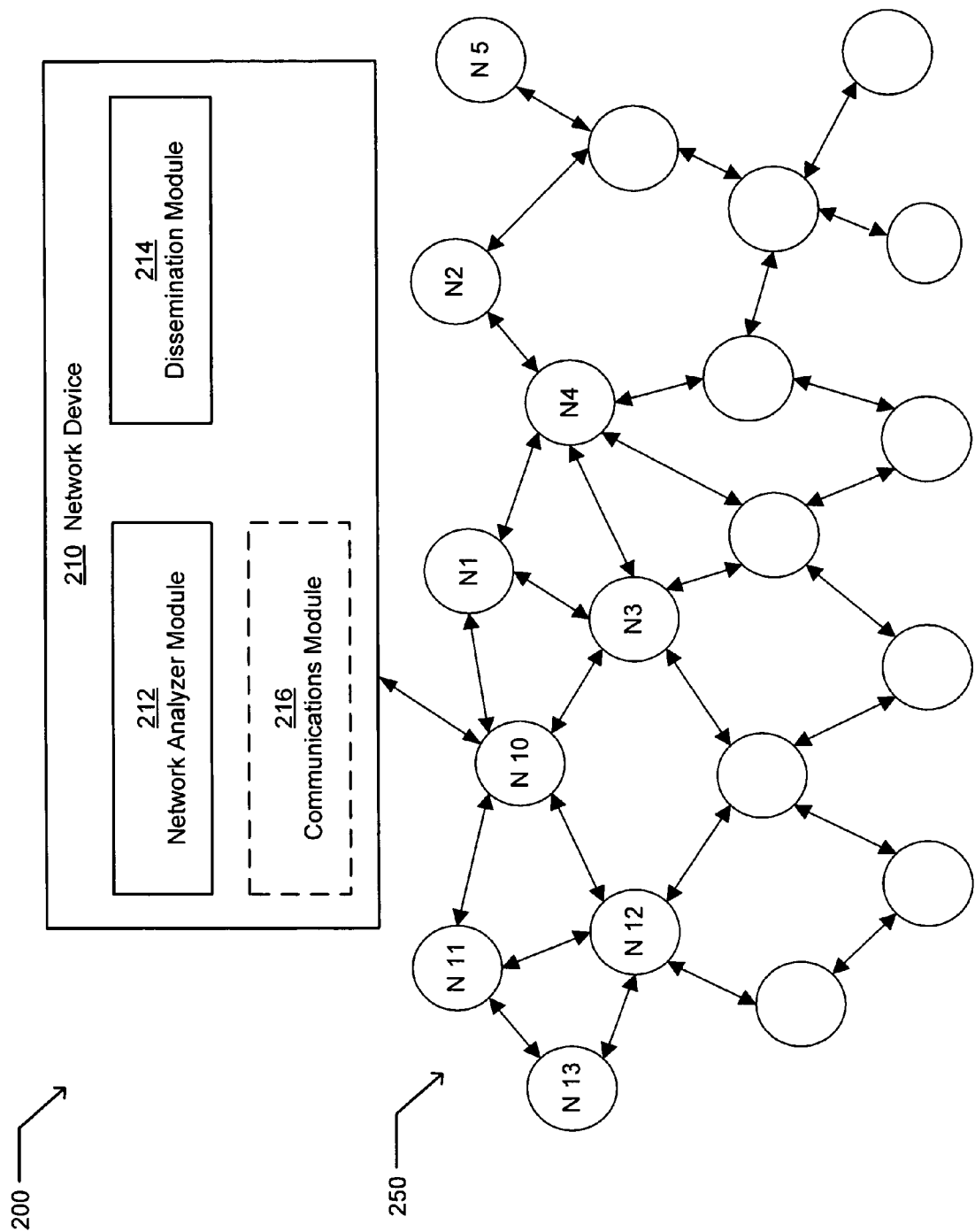
FIG. 2 illustrates an exemplary environment.

FIG. 2 illustrates an exemplary environment 200. The exemplary environment includes a network device 210 and a plurality of networked nodes 250. The network device includes a network analyzer module 212 and a dissemination module 214. The network analyzer module is operable to monitor the plurality of networked nodes for an indicium of an activity at each respective node. The dissemination module is operable to facilitate distribution of a malware countermeasure to a first set of networked nodes of the plurality of networked nodes in a manner responsive to an indicium of an activity associated with the first set of networked nodes of the plurality of networked nodes.

The plurality of networked nodes 250 may include at least any two nodes coupled directly or indirectly by a network. FIG. 2 illustrates the plurality of nodes as including nodes N1-N12. In an embodiment, at least a portion of the plurality of networked nodes may include a local area network (LAN) and/or a wide area network (WAN). In another embodiment, at least a portion of the plurality of networked nodes may include a personal area network. In a further embodiment, at least one of the plurality of networked nodes includes a wired node. In another embodiment, at least one of the plurality of networked nodes includes a wireless node. In an embodiment, at least one of the plurality of nodes includes a node couplable with the Internet.

In an embodiment, the network device 210 includes a computer networking device. In another embodiment, the malware includes at least one of a virus, a worm, Trojan horse, a rootkit, a spyware, an adware, a buffer overflow, a virus hoax, adware, a dialer, a hack tool, a joke program, a remote access without a user permission, a back door, a trackware, and/or a keystroke capture program.

In a further embodiment, the malware countermeasure includes a countermeasure useable in at least substantially reducing a harm causable by the malware. In another embodiment, the harm includes at least one of a detriment, an inconvenience, a logging of data, a spying, a downloading of a program, an unauthorized activation of a program, a display of an advertisement without a client permission, an unauthorized redirection of a URL, a malicious vector, an exploit, an at least substantial slowing of an operation of a computing device, a crashing a computing device, an unauthorized collection of data, and/or a loss of data.

In an embodiment, the network analyzer module 212 further includes a network analyzer module operable to examine a packet transmitted in a network for inspection and analysis. In certain embodiment, the network analyzer module may be characterized as a "sniffer," "packet sniffer," "packet analyzer," "traffic analyzer" and "protocol analyzer." In another embodiment, the "examine a packet" may include a capture, a sample, and/or a view of a packet. In a further embodiment, the network analyzer module further includes an operability to store packets for further analysis. In another embodiment, the network analyzer module further includes a network analyzer module implemented in at least one of a hardware, a software, and/or a firmware.

In an embodiment, the network analyzer module 212 further includes a network analyzer module operable to generate a list of nodes responsive to the monitoring of the plurality of networked nodes 250. In another embodiment, the network analyzer module further includes a network analyzer module operable to at least one of actively and/or passively monitor the plurality of networked nodes for an indicium of an activity at each respective node. In a further embodiment, the "actively monitor" includes broadcasting a query about connections that at least one node of the plurality of networked nodes has made over a period of time. In another embodiment, the network analyzer module further includes a network analyzer module operable to generate a topological map that includes each respective node of a plurality of networked nodes.

In an embodiment, the network analyzer module 212 further includes a network analyzer module operable to generate an information corresponding to each respective node of a plurality of networked nodes 250. In another embodiment, the network analyzer module further includes a network analyzer module operable to monitor a plurality of networked nodes for an indicium of an activity at each respective node, where at least one node of the plurality of networked nodes includes at least one of a read-only file server, a read-write file server, a file server, a web server, and/or a file-sharing node. In a further embodiment, the network analyzer module further includes a network analyzer module operable to monitor a plurality of networked nodes for an indicium of an activity at each respective node, the indicated activity corresponding to at least one of an operating system, a protocol, an application, a program, a usage, a traffic, a running service, and/or an active interface.

In an embodiment, the network analyzer module 212 further includes a network analyzer module operable to monitor a plurality of networked nodes 250 for an indicium of an activity at each respective node, the indicium of an corresponding to a presence of at least one of an iTunes® program, an Outlooks® brand email program, a Word® brand word processing program, an AOL® brand instant messenger program, and/or a Firefox® brand browser program. In another embodiment, the network analyzer module further includes a network analyzer module operable to monitor a plurality of networked nodes for an indicium of an activity at each respective node, the indicium of an activity corresponding to at least one of page loads, visits, unique visitors, new visitors, frequency of visits, and/or downloads.

In an embodiment, a node of a plurality of networked nodes 250 further includes another network device, a network appliance, a computing device, a desktop computing device, a laptop computing device, a mobile computing device, a host, a server, and/or a network card of a computing device. In another embodiment, a node of a plurality of networked nodes further includes a switch, a bridge, a router, an edge router, a gateway, a hub, and/or a repeater. In a further embodiment, a node of the plurality of networked nodes further includes a wired node, and/or a wireless node.

In an embodiment, the dissemination module 214 further includes a dissemination module operable to at least one of cause, assist, instigate, and/or initiate a distribution of a malware countermeasure to a first set of networked nodes of the plurality of networked nodes 250 in a manner responsive to an indicium of an activity associated with the first set of networked nodes of the plurality of networked nodes. In another embodiment, the dissemination module further includes a dissemination module operable to at least one of directly distribute, and/or cause another to distribute a malware countermeasure to a first set of networked nodes of the plurality of networked nodes in a manner responsive to an indicium of an activity associated with the first set of networked nodes of the plurality of networked nodes. In a further embodiment, the dissemination module further includes a dissemination module operable to facilitate distribution of a malware countermeasure to a first set of networked nodes of the plurality of networked nodes in a manner responsive to a criterion and to an indicium of an activity associated with the first set of networked nodes of the plurality of networked nodes.

In an embodiment, dissemination module 214 further includes a dissemination module operable to facilitate distribution of a malware countermeasure to a first set of networked nodes of the plurality of networked nodes 250 in a manner responsive to a criterion and to an indicium of an activity associated with the first set of networked nodes of the plurality of networked nodes. The criterion including a correlation between an aspect of the malware and an indicated activity associated with the first set. For example, the dissemination module is operable to disseminate a countermeasure for a worm exploiting a vulnerability in Internet Explorer to a first set of nodes running Internet Explorer. In another embodiment, the dissemination module further includes a dissemination module operable to facilitate distribution of a malware countermeasure to a first set of networked nodes of the plurality of networked nodes in a manner responsive to a correlation between a ranking criteria and an indicium of a rank of an activity associated with the first set of networked nodes of the plurality of networked nodes. For example, the dissemination module is operable to facilitate distribution of a malware countermeasure according to a criterion that includes a correlation between a ranking criteria designating the most active 10% as first to receive the malware countermeasure and the first set including the 10% most active nodes of the plurality of networked nodes 250. In this example, the most active nodes would receive a countermeasure first. Continuing with the above example, the next 10% most active nodes would receive the countermeasure next. In a further embodiment, the dissemination module further includes a dissemination module operable to facilitate distribution of a malware countermeasure received from another or a malware countermeasure generated by the network device 210 to a first set of networked nodes of the plurality of networked nodes in a manner responsive to an indicium of an activity associated with the first set of networked nodes of the plurality of networked nodes.

In an embodiment, the dissemination module 214 further includes a dissemination module implemented in hardware, firmware, and/or software. In a further embodiment, the dissemination module further includes a dissemination module operable to facilitate distribution of a malware countermeasure to a first set of networked nodes of the plurality of networked nodes in a manner responsive to an indicium of an activity associated with the first set of networked nodes of the plurality of networked nodes. The dissemination module then facilitates distribution of the malware countermeasure to a second set of networked nodes of the plurality of networked nodes in a manner responsive to an indicium of the activity associated with the second set of networked nodes of the plurality of networked nodes.

In an embodiment, the dissemination module 214 further includes a dissemination module operable to at least substantially sequentially: facilitate distribution of a malware countermeasure to a first set of networked nodes of the plurality of networked nodes 250 in a manner responsive to an indicium of an activity associated with the first set of networked nodes of the plurality of networked nodes; and then facilitate distribution of the malware countermeasure to a second set of networked nodes of the plurality of networked nodes in a manner responsive to an indicium of the activity associated with the second set of networked nodes of the plurality of networked nodes.

In another embodiment, the first set of networked nodes includes at least one node of the plurality of network nodes. In a further embodiment, the first set of networked nodes includes all nodes of the plurality of network nodes. In another embodiment, the first set of networked nodes includes less than all nodes of the plurality of network nodes. In a further embodiment, the second set of networked nodes includes at least one node of the plurality of network nodes. In an embodiment, the network device 210 further includes a communications module 216 operable to send a packet to at least one node of the plurality of networked node. In another embodiment, a packet includes a digital packet, a data packet, a network packet, a block of data, a frame, and/or datagram transmittable over a network.

In use, an embodiment provides a network device 210 that may function as an active node or a passive node of the plurality of networked nodes 250. For example, a passive network device may be passively coupled to a node of the plurality of networked nodes, illustrated in FIG. 2 as coupled to the node N1. The network analyzer module 212 may observe traffic across the plurality of networked nodes, behavior of at least one node of the plurality of networked nodes, and/or map a topography of the plurality of networked nodes. A goal of observation and/or monitoring includes gathering information useful in distribution of a malware countermeasure to one or more nodes having a significance in the plurality of networked nodes. A significance may include high bandwidth nodes. Another goal includes gathering information indicating a characteristic of each respective node of the plurality of nodes useful in tailoring a distribution of a malware countermeasure to one or more nodes having a vulnerability to a malware. A characteristic may include an operating system used by one or more nodes, and/or port activity.

Upon an indication that a malware countermeasure should be disseminated, the dissemination module 214 facilitates distribution of the malware countermeasure to a first set of networked nodes of the plurality of networked nodes. The first set of networked nodes is established in a manner responsive to an indicium of an activity associated with the first set of networked nodes of the plurality of networked nodes. For example, a rule set may be established that for a class of malware that the ten percent most active nodes of the plurality of networked nodes receive the malware countermeasure first. These nodes would constitute the first set of nodes. The rule set may then include distributing the malware countermeasure for the class of malware to the next ten percent most active nodes next, and so on. In another example, a rule set may be established that nodes using an operating system targeted by a malware receive the malware countermeasure first. For example, nodes using a Windows 2000 operating system will constitute the first set of nodes and receive a first distribution of a malware countermeasure indicated for a malware targeting Windows 2000 machines.

If the embodiment of the network device is a passive network device, then the dissemination module may instruct another node to distribute the malware countermeasure. For example, the dissemination module 214 may communicate with another network device at node N5, and node N5 in response transmits the malware countermeasure. Alternatively, if the embodiment of the network device is an active network device, the dissemination module may transmit the malware countermeasure.

Figure 3:
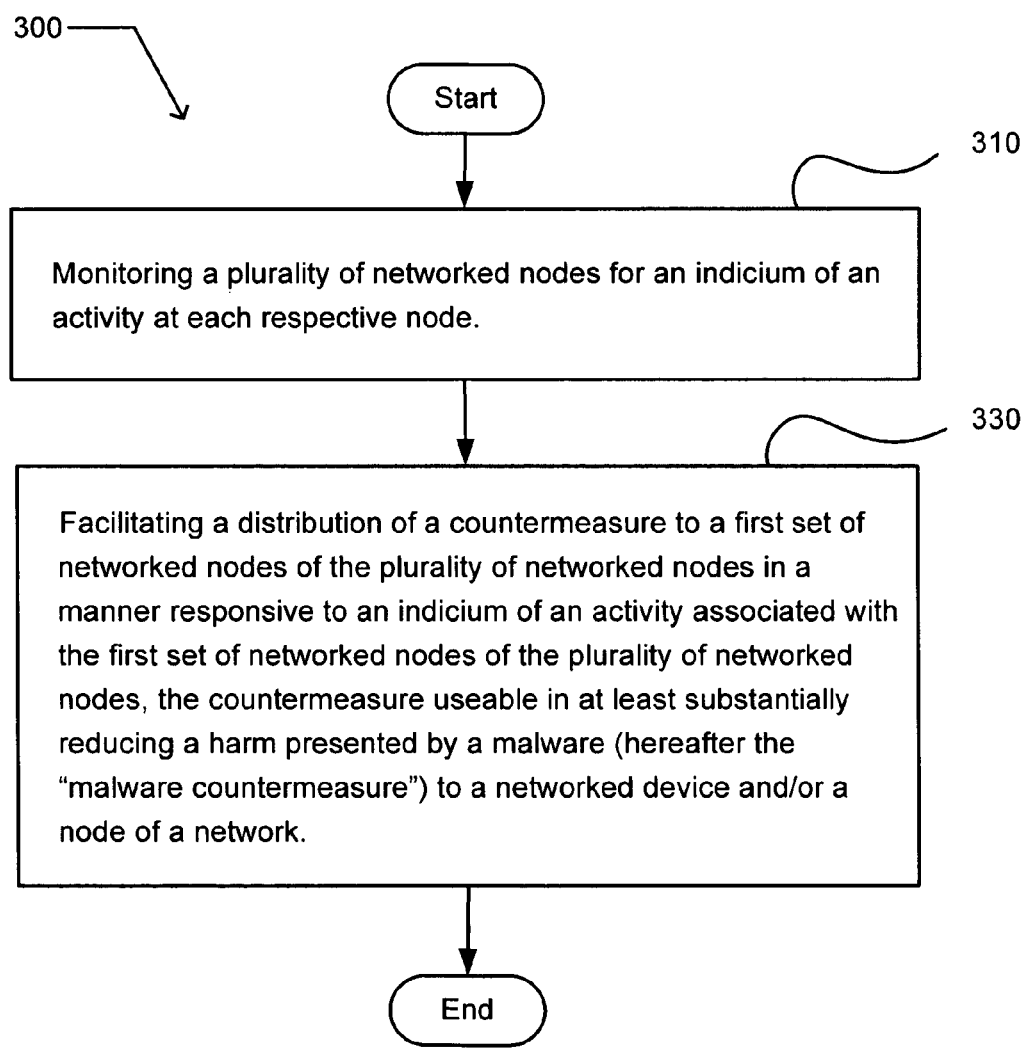
FIG. 3 illustrates an exemplary operational flow.

FIG. 3 illustrates an exemplary operational flow 300. After a start operation, the operational flow moves to an observation operation 310. The observation operation monitors a plurality of networked nodes for an indicium of an activity at each respective node. A propagation operation 330 facilitates a distribution of a countermeasure to a first set of networked nodes of the plurality of networked nodes in a manner responsive to an indicium of an activity associated with the first set of networked nodes of the plurality of networked nodes. The countermeasure being useable in at least substantially reducing a harm presented by a malware (hereafter the "malware countermeasure") to a networked device and/or a node of a network. The operational flow then moves to an end operation.

FIG. 4 illustrates an alternative embodiment of the operational flow 300 of FIG. 3. The observation operation 310 may include at least one additional operation. The at least one additional operation may include an operation 312, an operation 314, an operation 316, and/or an operation 318. The operation 312 examines a packet destined for a node of the plurality of networked nodes for an indicium of an activity corresponding to the node. The operation 314 generates a topological map that includes each node of the plurality of networked nodes. The operation 316 generates an information corresponding to each respective node of the plurality of networked nodes. The operation 318 at least one of actively and/or passively monitors a plurality of networked nodes for an indicium of an activity at each respective node.

FIG. 5 illustrates an alternative embodiment of the operational flow 300 of FIG. 3. The propagation operation 330 may include at least one additional operation. The at least one additional operation may include an operation 332, an operation 334, and/or an operation 336. The operation 332 at least one of causes, assists, instigates, and/or initiates a distribution of a malware countermeasure to a first set of networked nodes of the plurality of networked nodes in a manner responsive to an indicium of an activity associated with the first set of networked nodes of the plurality of networked nodes. The operation 334 facilitates distribution of a malware countermeasure to a first set of networked nodes of the plurality of networked nodes in a manner responsive to a correlation of an aspect of the malware and an indicium of an activity associated with the first set of networked nodes of the plurality of networked nodes. The operation 336 facilitates a distribution of a malware countermeasure to a first set of networked nodes of the plurality of networked nodes in a manner responsive to a correlation of an Outlook® orientated email virus and an indicium of a presence of an Outlook® email program associated with the first set of networked nodes of the plurality of networked nodes.

FIG. 6 illustrates another alternative embodiment of the operational flow 300 of FIG. 3. The propagation operation 330 may include at least one additional operation. The at least one additional operation may include an operation 338. The operation 338 facilitates distribution of a malware countermeasure to a first set of networked nodes of the plurality of networked nodes in a manner responsive to a correlation of a Windows® orientated worm and an indicium of a use of a Windows® XP OS associated with the first set of networked nodes of the plurality of networked nodes. The operation 338 at least subsequently then facilitates a distribution of a malware countermeasure to a second set of networked nodes of the plurality of networked nodes in a manner responsive to a correlation of the Windows® orientated worm and an indicium of a use of a Windows® 2000 OS associated with the second set of networked nodes of the plurality of networked nodes.

FIG. 7 illustrates a further embodiment of the operational flow 300 of FIG. 3. The propagation operation 330 may include at least one additional operation. The at least one additional operation may include an operation 342, and/or an operation 344. The operation 342 facilitates a distribution of a malware countermeasure to a first set of networked nodes of the plurality of networked nodes in a manner responsive to a correlation of a web browser worm and an indicium of a use of a Internet Explorer® web browser associated with the first set of networked nodes of the plurality of networked nodes. The operation 342 at least subsequently then facilitates a distribution of a malware countermeasure to a second set of networked nodes of the plurality of networked nodes in a manner responsive to a correlation of the web browser orientated worm and an indicium of a use of a Firefox® web browser associated with the second set of networked nodes of the plurality of networked nodes. The operation 344 facilitates a distribution of a malware countermeasure to a first set of networked nodes of the plurality of networked nodes in a manner responsive to a correlation of a criterion and an indicium of an activity associated with the first set of networked nodes of the plurality of networked nodes.

FIG. 8 illustrates an exemplary computer-program product 400. The computer-program product includes program instructions 410 operable to perform a process in a computing device. The process includes monitor a plurality of networked nodes for an indicium of an activity at each respective node. The process also includes facilitate a distribution of a malware countermeasure to a first set of networked nodes of the plurality of networked nodes in a manner responsive to an indicium of an activity associated with the first set of networked nodes of the plurality of networked nodes. The computer-program product also includes a computer-readable signal-bearing medium 405 bearing the program instructions.

In an alternative embodiment, the process of facilitate a distribution of a malware countermeasure further includes facilitate a distribution of a malware countermeasure to a first set of networked nodes of the plurality of networked nodes in a manner responsive to correlation between a criterion and an indicium of an activity associated with the first set of networked nodes of the plurality of networked nodes. In another embodiment, the computer-readable signal-bearing medium 405 includes a computer storage medium 422. In another embodiment, the computer-readable signal-bearing medium includes a communication medium 424.

Figure 9:
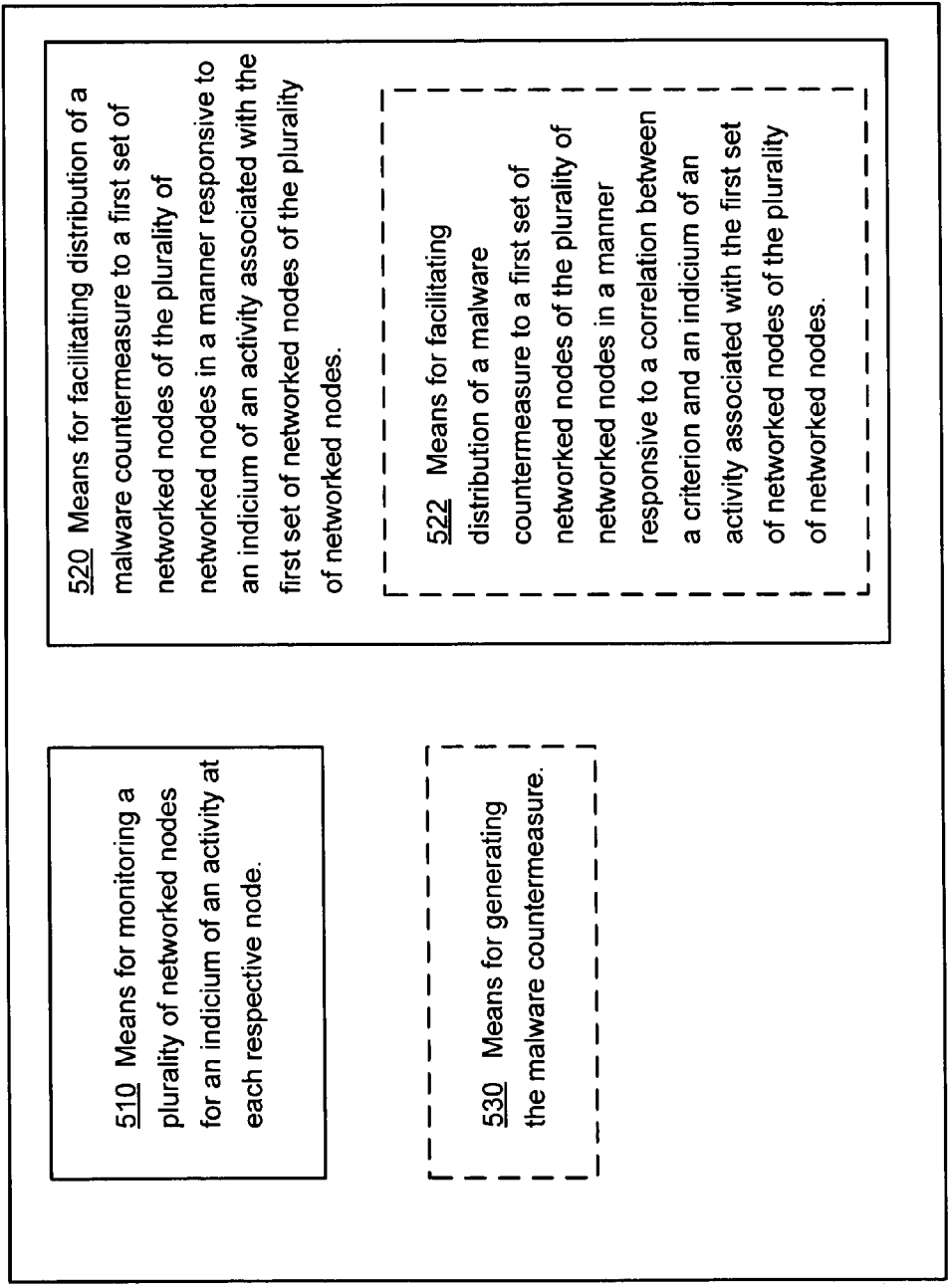
FIG. 9 illustrates an exemplary network device.

FIG. 9 illustrates an exemplary network device 500. The network device includes means 510 for monitoring a plurality of networked nodes for an indicium of an activity at each respective node. The network device also includes means 520 for facilitating distribution of a malware countermeasure to a first set of networked nodes of the plurality of networked nodes in a manner responsive to an indicium of an activity associated with the first set of networked nodes of the plurality of networked nodes.

In an alternative embodiment, the means 520 further includes means 552 for facilitating distribution of a malware countermeasure to a first set of networked nodes of the plurality of networked nodes in a manner responsive to a correlation between a criterion and an indicium of an activity associated with the first set of networked nodes of the plurality of networked nodes. In another alternative embodiment, the network device further includes means 530 for generating the malware countermeasure.

Figure 10:
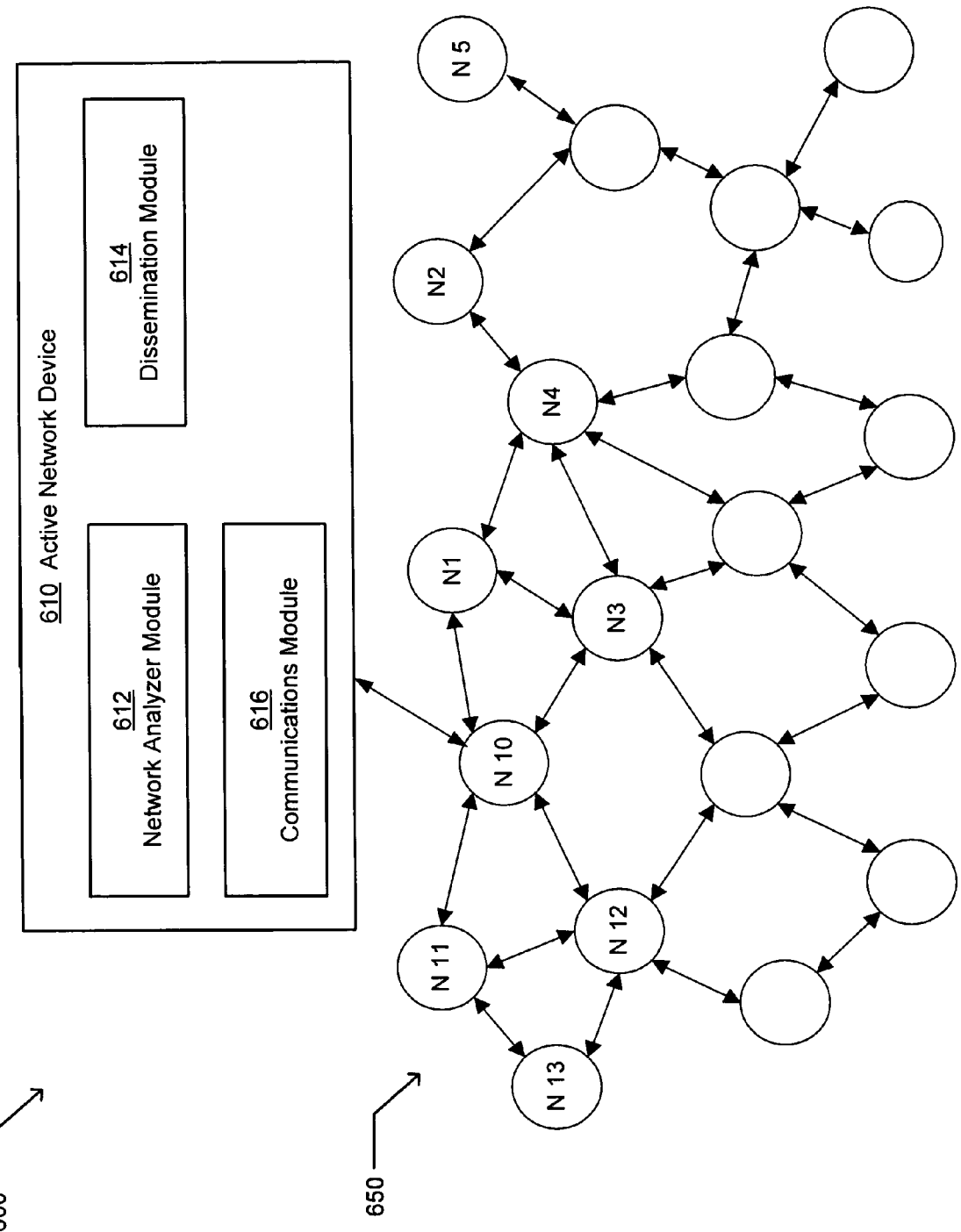
FIG. 10 illustrates an exemplary environment.

FIG. 10 illustrates an exemplary environment 600. The environment includes an active network device 610 and a plurality of networked nodes 650. In an embodiment, the plurality of networked nodes may be at least substantially similar to the plurality of networked nodes 250 of FIG. 2. The active network device includes a communications module 616, a network analyzer module 612, and a dissemination module 614. The communications module includes a communications module operable to facilitate a movement of packets to at least one node of a plurality of networked nodes. The network analyzer module includes a network analyzer module operable to monitor each respective node of the plurality of networked nodes for an indicium of an activity. The dissemination module includes a dissemination module operable to distribute a malware countermeasure to a first set of nodes of the plurality of networked nodes in a manner responsive to the indicium of an activity corresponding to the first set of networked nodes of the plurality of networked nodes.

In an embodiment, the active network device 610 includes a computer networking device. In another embodiment, the active network device includes an active digital network device implementing a TCP/IP, a SONET, an ATM, an IPX, and/or wireless protocol. For example, a wireless protocol may include an IEEE 802.11 protocol.

In an embodiment, the communications module 616 further includes a communications module operable to forward packets to the at least one node of a plurality of networked nodes. In another embodiment, the communications module further includes a communications module operable to receive and forward a packet to at least one node of the plurality of networked nodes.

Figure 11:
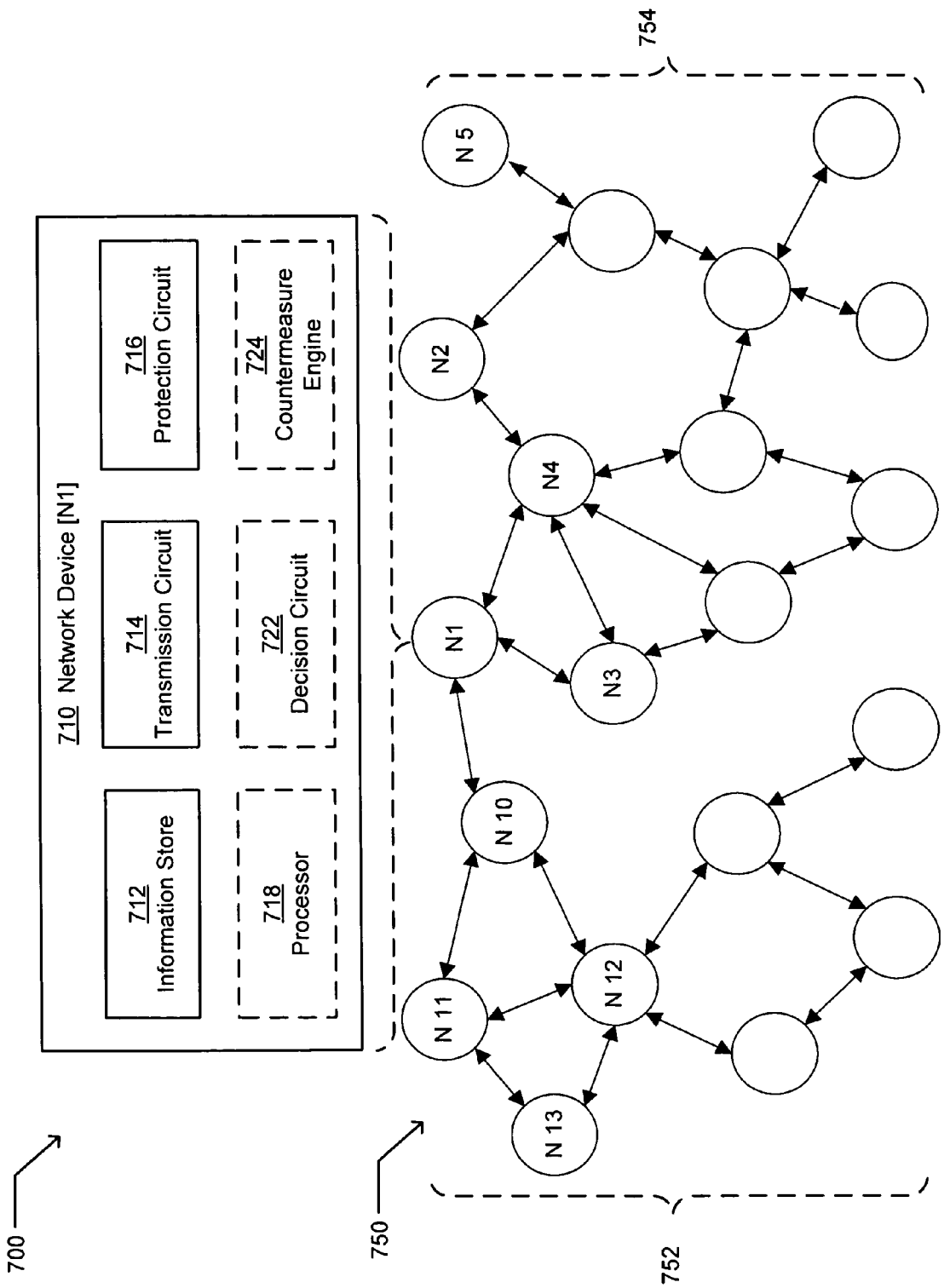
FIG. 11 illustrates an exemplary environment.

FIG. 11 illustrates an exemplary environment 700. The exemplary environment includes a network that includes a plurality of sub-network nodes 750. The plurality of sub-network nodes include a first sub-network of the plurality network nodes, illustrated as a first sub-network 752 that includes nodes N10-N13, and a second sub-network of the plurality of network nodes, illustrated as a second sub-network 754 that includes nodes N2-N6. In an embodiment, the plurality of sub-network nodes may be at least substantially similar to the plurality of networked nodes 250 of FIG. 2. The exemplary environment also includes a network device 710, illustrated as a node N1. In an embodiment, the network device may include a network appliance, a computing device, a desktop computing device, a laptop computing device, a mobile computing device, a host, a server, and/or a network card of a computing device. In another embodiment, the network device may include a switch, a bridge, a router, an edge router, a gateway, a hub, and/or a repeater. In an embodiment, a node of the plurality of networked nodes further includes a wired node, and/or a wireless node. In another embodiment, the network device includes a network device wirelessly couplable to a node the plurality of networked nodes. In a further embodiment, the network device includes a network device physically couplable to a node of the plurality of networked nodes. For example, a physically couplable may include directly and/or indirectly couplable using an Ethernet cable, a fiber optic cable, and/or other connector that includes a physical communications media.

The network device 710 includes an information store 712, a transmission circuit 714, and a protection circuit 716. The information store includes an information store operable to save a countermeasure useable in at least substantially reducing a harm caused by a malware (hereafter the "malware countermeasure"). The transmission circuit includes a transmission circuit for sending a packet to at least one sub-network of a plurality of sub-networks 750. The protection circuit includes a protection circuit for implementing the malware countermeasure in the network device. In an alternative embodiment, the protection circuit includes a protection circuit for implementing the malware countermeasure on the network device.

In an embodiment, the information store 712 further includes an information store implemented in at least one of a computer storage media, a digital information storage device, a group of digital information storage devices, and/or a quantum memory device operable to save a countermeasure useable in at least substantially reducing a harm caused by a malware. In another embodiment, the transmission circuit 714 further includes a transmission circuit for receiving a packet from a node of another network and communicating the received packet to at least a node of the least one sub-network of a plurality of sub-networks.

In an embodiment, the protection circuit 716 further includes a protection circuit for applying the malware countermeasure in the network device 710. In another embodiment, the protection circuit further includes a protection circuit for implementing the malware countermeasure in the network device. The implementing the malware countermeasure includes closing at least one port (not shown) of the network device. In a further embodiment, the protection circuit further includes a protection circuit for implementing the malware countermeasure in the network device, the implementing the malware countermeasure including at least substantially isolating the network device from a network. For example, the network device may be isolated from the plurality of sub-networks 750. Alternatively, the network device may be isolated from the Internet (not shown). In another embodiment, the protection circuit further includes a protection circuit for implementing the malware countermeasure in the network device, the implementing the malware countermeasure including at least substantially isolating at least one sub-network of the plurality sub-networks from the network device. For example, the network device may isolate the sub-network 752 from the network device.

In an embodiment, the protection circuit 716 further includes a protection circuit for implementing the malware countermeasure in the network device 710. The implementing the malware countermeasure includes at least substantially isolating at least one node of the plurality of sub-networks 750 from the network device 710. For example, the node N2 may be logically isolated from the network device. In another embodiment, the protection circuit further includes a protection circuit for implementing the malware countermeasure in the network device, the implementing the malware countermeasure including at least substantially isolating the first sub-network 752 of the plurality sub-networks from the second sub-network 754 of the plurality sub-networks. In a further embodiment, the protection circuit further includes a protection circuit for implementing the malware countermeasure in the network device, the implementing the malware countermeasure including at least substantially isolating at least two sub-networks (752, 754) of the plurality sub-networks from another network, such as the Internet (not shown).

In an embodiment, the protection circuit 716 further includes a protection circuit for implementing the malware countermeasure in the network device 710. The implementing the malware countermeasure includes at least substantially isolating the network device from at least one network address of a sub-network of the plurality sub-networks 750. In another embodiment, the protection circuit further includes a protection circuit for implementing the malware countermeasure in the network device, the implementing the malware countermeasure including at least substantially reducing a functionally of the network device. The reduced functionality may include a restricted communication right, a reduced transmission rate and/or volume, a reduced reception rate and/or volume, a restriction against performing a destructive writing operation, a blocking an application from running, a disabling an account, and/or a forcing a user and/or an application to execute in a tighter security environment. In a further embodiment, the protection circuit further includes a protection circuit for implementing the malware countermeasure in the network device, the implementing the malware countermeasure including at least substantially reducing a communication privilege allowed a node of one sub-network of the plurality of sub-networks. The reduced communication privilege may include a right to send only, or a right to receive only. Alternatively, the reduced communication privilege may include a right to send only a specified file format, such as TIF or a PDF format.

In an embodiment, the protection circuit 716 further includes a protection circuit for implementing the malware countermeasure in the network device 710. The implementing the malware countermeasure including sending a notice receivable by a device (not shown) associatable with a person. For example, the protection circuit may be configured to send an email to an email account associated with a network administrator, to send a text message to a portable wireless device carried by the network administrator, such as a cell phone, and/or to send a recorded voice message to a telephone number designated by the network administrator. In another embodiment, the protection circuit further includes a protection circuit for implementing the malware countermeasure in the network device if the criterion is met for implementation of the malware countermeasure.

In an embodiment, the network device 710 further includes a processor 718. The processor may be at least substantially similar to the processor 120 of FIG. 1. In another embodiment, the network device further includes a decision circuit 722 for determining if a criterion is met for implementation of the malware countermeasure. In a further embodiment, the network device may include a countermeasure engine 724 operable to generate the malware countermeasure.

In an embodiment, the decision circuit 722 further includes a decision circuit for determining if an authorization to implement the countermeasure has been received. In another embodiment, the decision circuit further includes a decision circuit for determining if a presence of the malware is indicated. In a further embodiment, the decision circuit further includes a decision circuit for determining if an indicium of the malware is present in at least one of the network device, and/or in a node of the at least on sub-network of a plurality of sub-networks.

Figure 12:
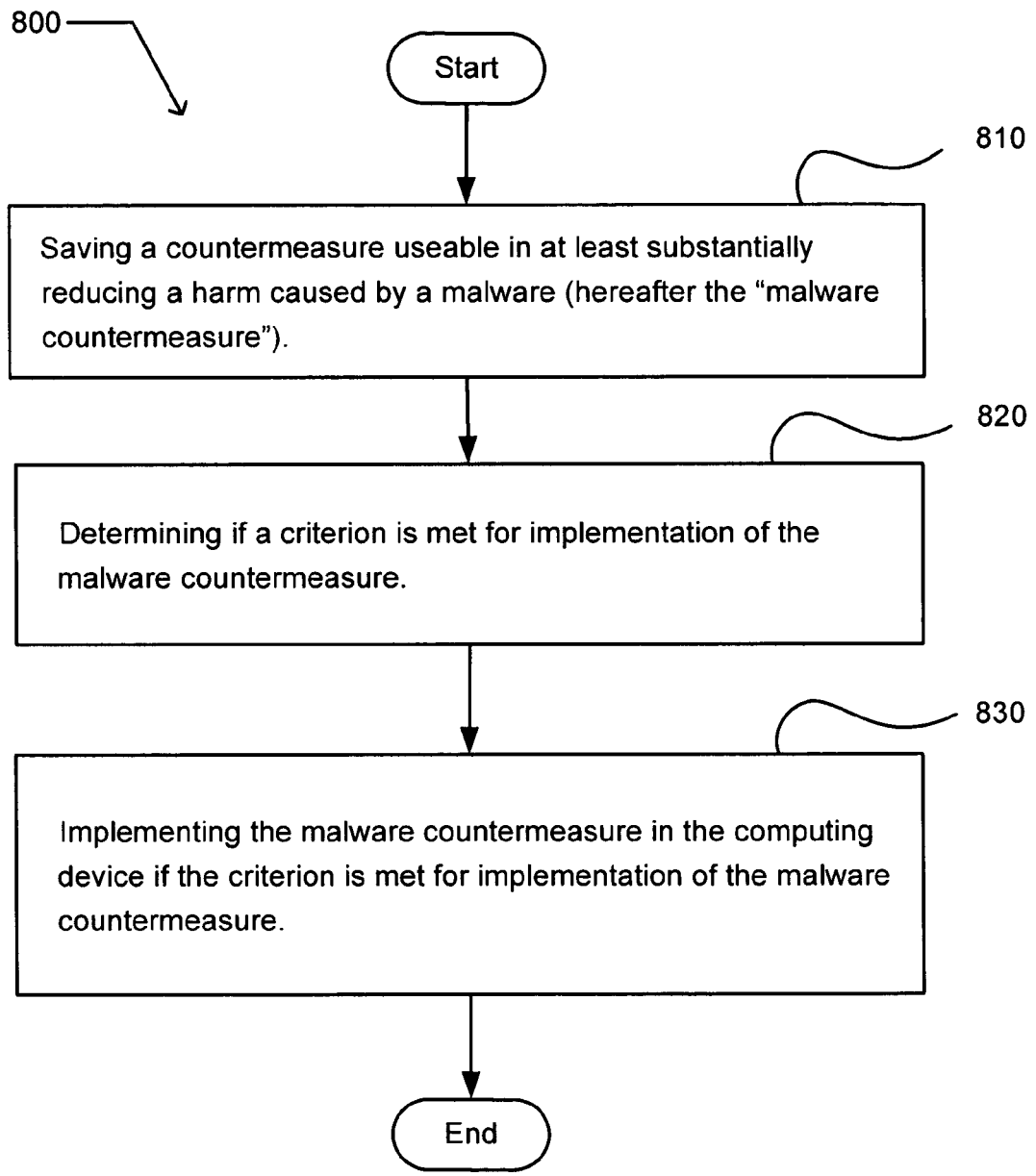
FIG. 12 illustrates an exemplary operational flow implemented in a computing device operable to facilitate communication of a packet to at least one sub-network of a plurality of sub-networks.

FIG. 12 illustrates an exemplary operational flow 800 implemented in a computing device operable to facilitate communication of a packet to at least one sub-network of a plurality of sub-networks. After a start operation, the operational flow moves to a storage operation 810. The storage operation saves a countermeasure useable in at least substantially reducing a harm caused by a malware (hereafter the "malware countermeasure"). A decision operation 820 determines if a criterion is met for implementation of the malware countermeasure. An effectuation operation 830 implements the malware countermeasure in the computing device if the criterion is met for implementation of the malware countermeasure.

Figure 13:
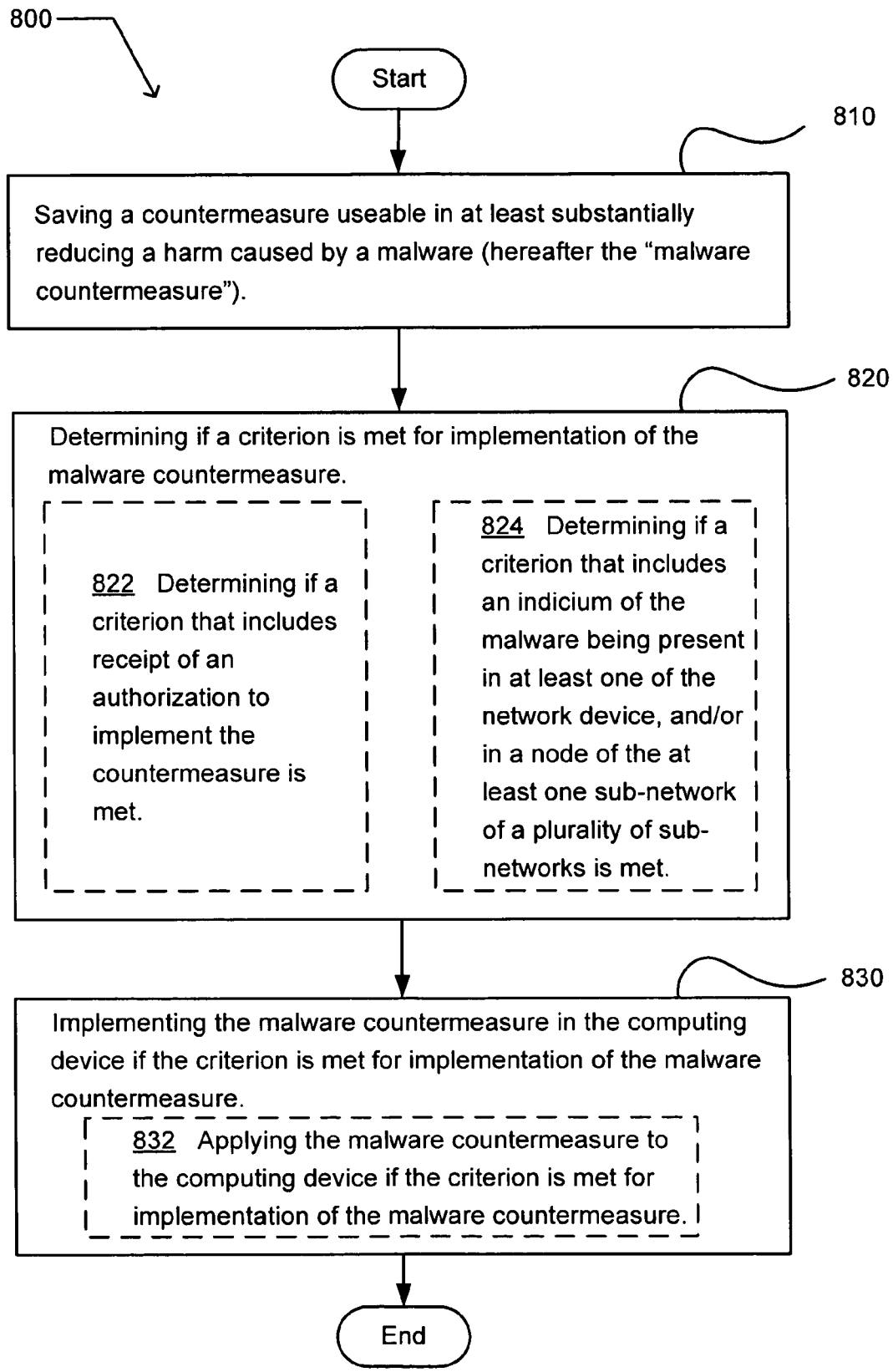
FIG. 13 illustrates an alternative embodiment of the operational flow of FIG. 12.

FIG. 13 illustrates an alternative embodiment of the operational flow 800 of FIG. 12. The decision operation 820 may include at least one additional operation. The at least one additional operation may include an operation 822, and/or an operation 824. The operation 822 determines if a criterion that includes receipt of an authorization to implement the countermeasure is met. The operation 824 determines if a criterion that includes an indicium of the malware being present in at least one of the network device, and/or in a node of the at least one sub-network of a plurality of sub-networks is met. The effectuation operation 830 may include at least one additional operation, such as an operation 832. The operation 832 applies the malware countermeasure to the computing device if the criterion is met for implementation of the malware countermeasure.

Figure 14:
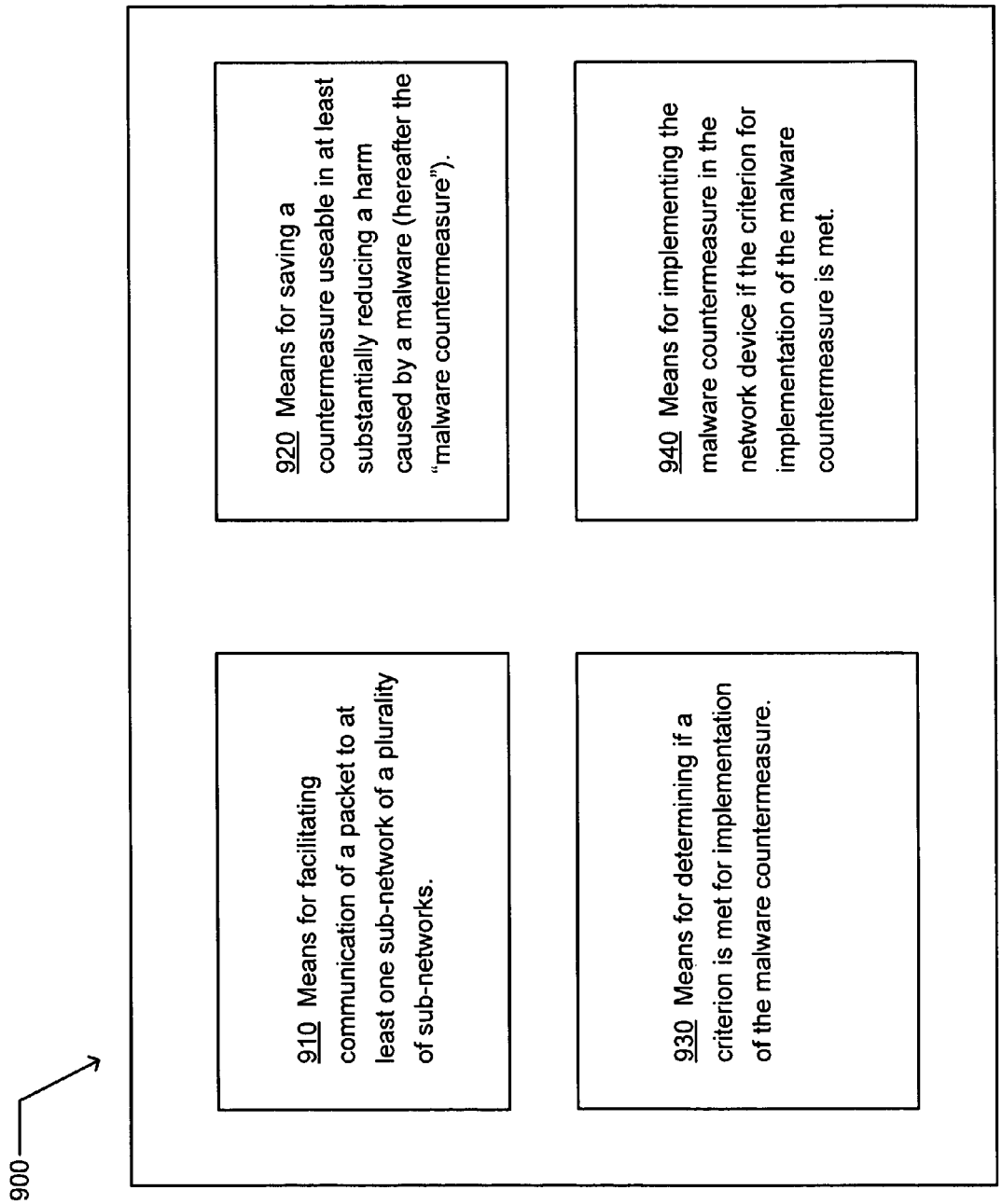
FIG. 14 illustrates an exemplary network device.

FIG. 14 illustrates an exemplary network device 900. The network device includes means 910 for facilitating communication of a packet to at least one sub-network of a plurality of sub-networks. The network device also includes means 920 for saving a countermeasure useable in at least substantially reducing a harm caused by a malware (hereafter the "malware countermeasure"). The network device further includes means 930 for determining if a criterion is met for implementation of the malware countermeasure. The network device also includes means 940 for implementing the malware countermeasure in the network device if the criterion for implementation of the malware countermeasure is met.

FIG. 15 illustrates an exemplary computer-program product 1000. The computer-program product includes program instructions 1010 operable to perform a process in a computing device. The process includes saving a countermeasure useable in at least substantially reducing a harm presented by a malware (hereafter the "malware countermeasure") to a networked device and/or a node of a network. The process also includes determining if a criterion for implementation of the malware countermeasure is met. The process further includes implementing the malware countermeasure in the computing device if the criterion is met for implementation of the malware countermeasure. The computer-program product also includes a computer-readable signal-bearing medium 1005 bearing the program instructions. In an embodiment, the computer-readable signal-bearing medium includes a computer storage medium 1022. In another embodiment, the computer-readable signal-bearing medium includes a communication medium 1024.

Figure 16:
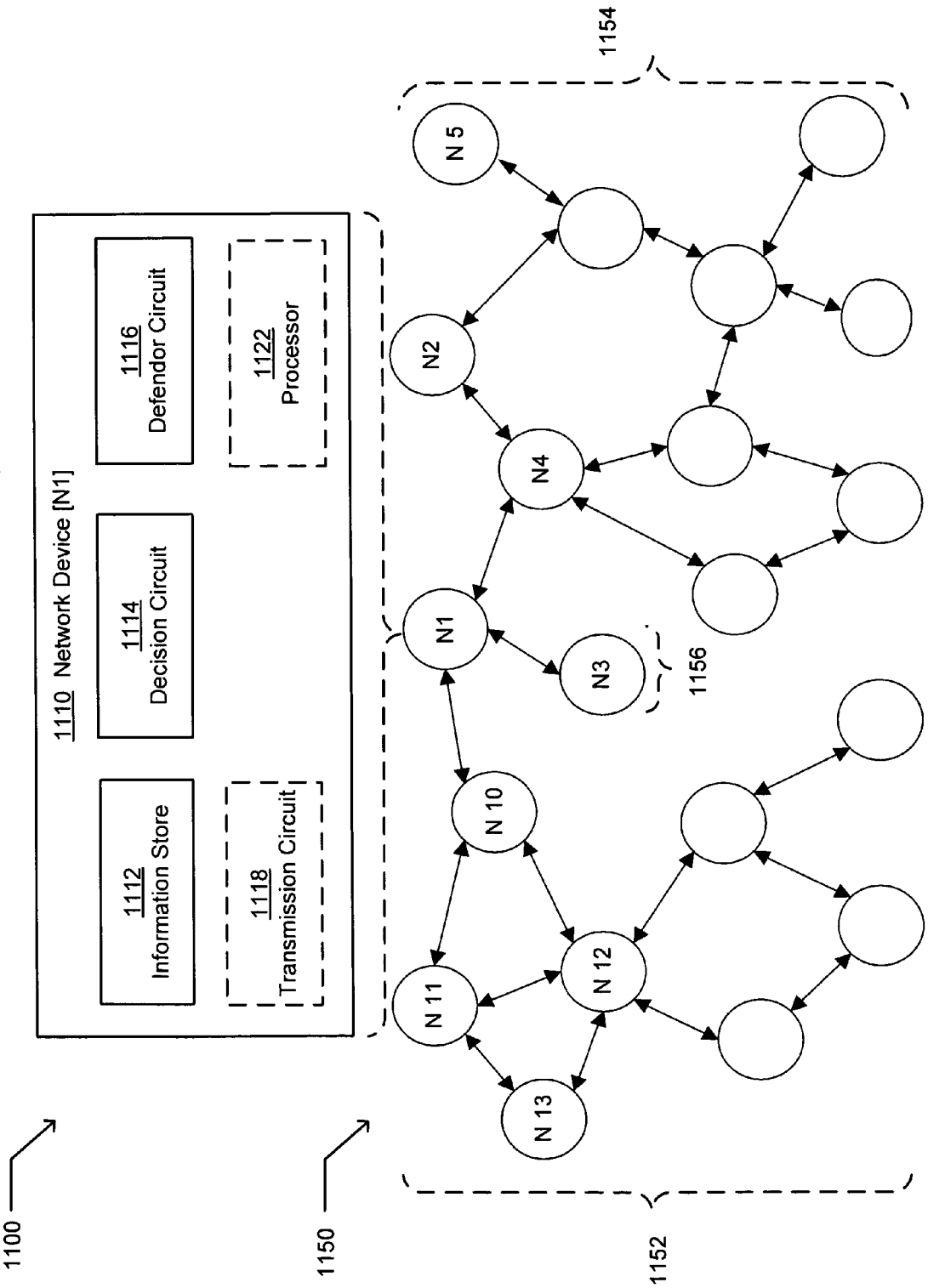
FIG. 16 illustrates an exemplary environment.

FIG. 16 illustrates an exemplary environment 1100. The exemplary environment includes a plurality of networked nodes 1150 that includes a node N1. The node N1 includes a network device, illustrated as a network device 1110 (N1). The plurality of networked nodes includes a plurality of sub-networks. The plurality of sub-networks are illustrated as a sub-network 1152 that includes nodes N10-N13, a sub-network 1154 that includes nodes N2-N5, and a sub-network 1156 that includes node N3. In another embodiment, at least one of the plurality of networked nodes includes a wired node. In another embodiment, at least one of the plurality of networked nodes includes a wireless node. In an embodiment, at least one of the plurality of nodes includes a node couplable with the Internet.

The network device 1110 includes an information store 1112, a decision circuit 1114, and a defender circuit 1116. The information store includes an information store configurable by a countermeasure useable in at least substantially reducing a harm caused by a malware (hereafter a "malware countermeasure"). The decision circuit includes a decision circuit for determining if a criterion for implementation of a malware countermeasure is met. The defender circuit includes a defender circuit for applying a malware countermeasure to the network device if the criterion for implementation of a malware countermeasure is met.

In an embodiment, the decision circuit 1114 further includes a decision circuit for determining if a criterion for implementation of a malware countermeasure is met and for selecting a malware countermeasure for application to the network device from among at least two malware countermeasures. In another embodiment, the defender circuit 1116 further includes a defender circuit for applying the selected malware countermeasure to the network device. In a further embodiment, the defender circuit further includes a defender circuit for applying a malware countermeasure to the network device and for generating the malware countermeasure.

In an embodiment, the defender circuit 1116 further includes a defender circuit for applying a malware countermeasure to the network device 1110. The application of the malware countermeasure includes at least one of: closing at least one port of the network device 1110; at least substantially isolating the network device from a network; at least substantially isolating at least one sub-network of the plurality sub-networks from the network device; at least substantially isolating at least one node of a sub-network of the plurality sub-networks from the network device; and/or at least substantially isolating a first sub-network of the plurality sub-networks from a second sub-network of the plurality sub-networks. In another embodiment, the defender circuit further includes a defender circuit for applying a malware countermeasure to the networked device. The application of the malware countermeasure includes at least one of: at least substantially isolating at least two sub-networks of the plurality sub-networks from another network; at least substantially isolating the network device from at least one network address of a sub-network of the plurality sub-networks; at least substantially reducing a functionally of the network device; at least substantially reducing a communication privilege allowed a node of one sub-network of the plurality of sub-networks; and/or sending a notice receivable by a device associatable with a person associated of the network device.

In an embodiment, the network device includes a transmission circuit 1118 for receiving a packet from a network and facilitate transmission of the packet to at least one sub-network of a plurality of sub-networks. In another embodiment, the network device includes a processor 1122.

Figure 17:
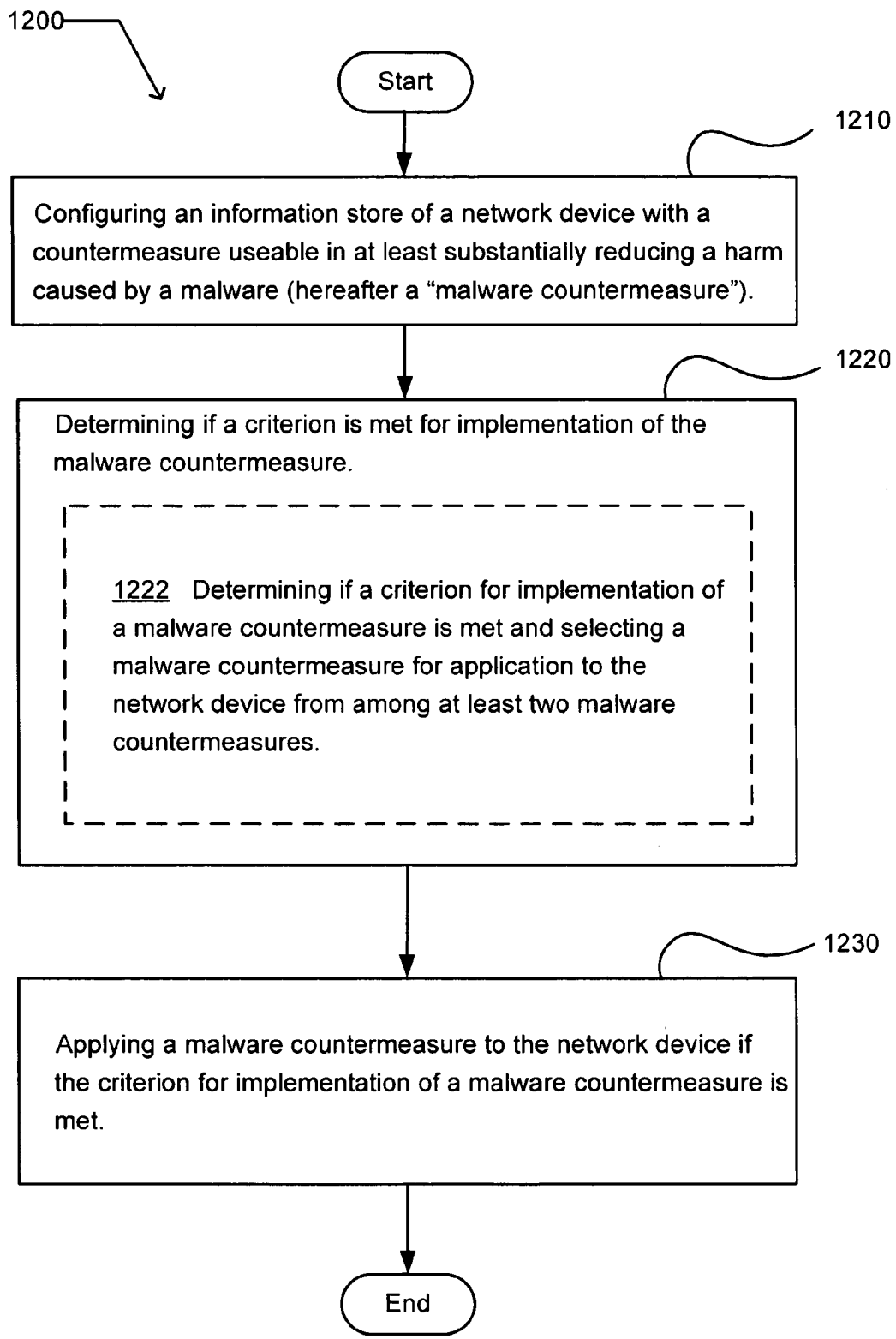
FIG. 17 illustrates an exemplary operational flow.

FIG. 17 illustrates an exemplary operational flow 1200. After a start operation, the operational flow includes a saving operation 1210. The saving operation configures an information store of a network device with a countermeasure useable in at least substantially reducing a harm caused by a malware (hereafter a "malware countermeasure"). A decision operation 1220 determines if a criterion for implementation of a malware countermeasure is met. A protection operation 1230 applies a malware countermeasure to the network device if the criterion for implementation of a malware countermeasure is met. The operational flow then moves to an end operation.

In an alternative embodiment, the decision operation 1220 may include at least one additional operation, such as an operation 1222. The operation 1222 determines if a criterion for implementation of a malware countermeasure is met, and selects a malware countermeasure for application to the network device from among at least two malware countermeasures.

Figure 18:
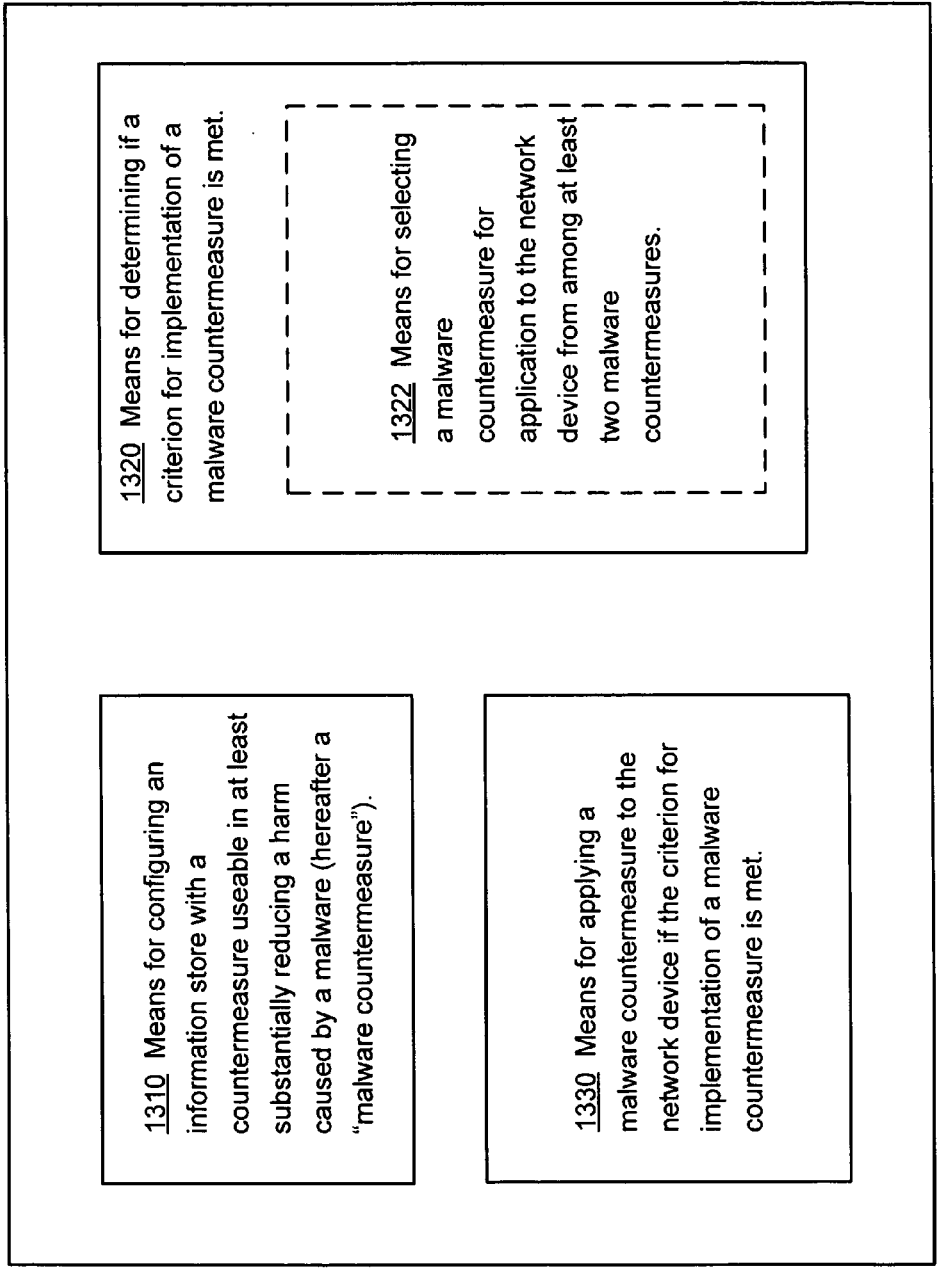
FIG. 18 illustrates an exemplary network device.

FIG. 18 illustrates an exemplary network device 1300. The network device includes means 1310 for configuring an information store with a countermeasure useable in at least substantially reducing a harm caused by a malware (hereafter a "malware countermeasure"). The network device further includes means 1320 for determining if a criterion for implementation of a malware countermeasure is met. The network device further includes means 1330 for applying a malware countermeasure to the network device if the criterion for implementation of a malware countermeasure is met. In an alternative embodiment, the means 1320 further includes a means 1322 for selecting a malware countermeasure for application to the network device from among at least two malware countermeasures.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A network device comprising:
an information store operable to save a countermeasure useable in at least substantially reducing a harm caused by a malware (hereafter the "malware countermeasure");
a network analyzer coupled to the information store, the network analyzer module operable to generate a topological map to identify each respective node of a plurality of network nodes including at least one sub-network of a plurality of sub-networks;
a transmission circuit for sending a packet to at least the one sub-network of the plurality of sub-networks;
a protection circuit for implementing the malware countermeasure in the network device, the implementing the malware countermeasure including at least substantially reducing a communication privilege allowed a node of one sub-network of the plurality of sub-networks, wherein the node is operable to communicate after the protection circuit implements the malware countermeasure in the network device, the implementing the malware countermeasure further including at least substantially reducing a functionality of the network device, the reduced functionality including a restriction against performing a destructive writing operation, a blocking an application from running, and a forcing a user and/or an application to execute in a tighter security environment; and
a decision circuit for determining if a criterion is met for implementation of the malware countermeasure.

2. The network device of claim 1, wherein the information store operable to save a countermeasure useable in at least substantially reducing a harm caused by a malware further includes:
an information store implemented in at least one of a computer storage media, a digital information storage device, a group of digital information storage devices, and/or a quantum memory device operable to save a countermeasure useable in at least substantially reducing a harm caused by a malware.

3. The network device of claim 1, wherein the transmission circuit for sending a packet to at least one sub-network of a plurality of sub-networks further includes:
a transmission circuit for receiving a packet from a node of another network and communicating the received packet to at a node of the least one sub-network of a plurality of sub-networks.

4. The network device of claim 1, wherein the protection circuit for implementing the malware countermeasure in the network device further includes:
a protection circuit for applying the malware countermeasure in the network device.

5. The network device of claim 1, wherein the protection circuit for implementing the malware countermeasure in the network device further includes:
a protection circuit for implementing the malware countermeasure in the network device, the implementing the malware countermeasure further including closing at least one port of the network device.

6. The network device of claim 1, wherein the protection circuit for implementing the malware countermeasure in the network device further includes:
a protection circuit for implementing the malware countermeasure in the network device, the implementing the malware countermeasure further including at least substantially isolating the network device from a network.

7. The network device of claim 1, wherein the protection circuit for implementing the malware countermeasure in the network device further includes:
a protection circuit for implementing the malware countermeasure in the network device, the implementing the malware countermeasure further including at least substantially isolating at least one sub-network of the plurality sub-networks from the network device.

8. The network device of claim 1, wherein the protection circuit for implementing the malware countermeasure in the network device further includes:
a protection circuit for implementing the malware countermeasure in the network device, the implementing the malware countermeasure further including at least substantially isolating at least one node of a sub-network of the plurality sub-networks from the network device.

9. The network device of claim 1, wherein the protection circuit for implementing the malware countermeasure in the network device further includes:
a protection circuit for implementing the malware countermeasure in the network device, the implementing the malware countermeasure further including at least substantially isolating a first sub-network of the plurality sub-networks from a second sub-network of the plurality sub-networks.

10. The network device of claim 1, wherein the protection circuit for implementing the malware countermeasure in the network device further includes:
a protection circuit for implementing the malware countermeasure in the network device, the implementing the malware countermeasure further including at least substantially isolating at least two sub-networks of the plurality sub-networks from another network.

11. The network device of claim 1, wherein the protection circuit for implementing the malware countermeasure in the network device further includes:
a protection circuit for implementing the malware countermeasure in the network device, the implementing the malware countermeasure further including at least substantially isolating the network device from at least one network address of a subnetwork of the plurality sub-networks.

12. The network device of claim 1, wherein the protection circuit for implementing the malware countermeasure in the network device further includes:
a protection circuit for implementing the malware countermeasure in the network device, the implementing the malware countermeasure further including sending a notice receivable by a device associatable with a person, wherein sending the notice comprises sending an email to an email account associated with the person, and/or sending a text message to a portable wireless device carried by the person, and/or sending a recorded voice message to a telephone number designated by the person.

13. The network device of claim 1, wherein the protection circuit for implementing the malware countermeasure in the network device further includes:
a protection circuit for implementing the malware countermeasure in the network device if the criterion is met for implementation of the malware countermeasure.

14. The network device of claim 1, further comprising:
a processor.

15. The network device of claim 1, wherein the decision circuit for determining if a criterion is met for implementation of the malware countermeasure further includes:

a decision circuit for determining if an authorization to implement the countermeasure has been received.

16. The network device of claim 1, wherein the decision circuit for determining if a criterion is met for implementation of the malware countermeasure further includes:
a decision circuit for determining if a presence of the malware is indicated.

17. The network device of claim 1, wherein the decision circuit for determining if a criterion is met for implementation of the malware countermeasure further includes:
a decision circuit for determining if an indicium of the malware is present in at least one of the network device, and/or in a node of the at least on sub-network of a plurality of sub-networks.

18. The network device of claim 1, further comprising:
a countermeasure engine operable to generate the malware countermeasure.

19. A method implemented in a computing device operable to facilitate communication of a packet to at least one sub-network of a plurality of sub-networks, the method comprising:
saving a countermeasure useable in at least substantially reducing a harm caused by a malware (hereafter the "malware countermeasure");
generating a topological map to identify each respective node of a plurality of network nodes including the at least one sub-network of the plurality of sub-networks;
determining if a criterion is met for implementation of the malware countermeasure; and
implementing the malware countermeasure in the computing device if the criterion is met for implementation of the malware countermeasure, the implementing the malware countermeasure including at least substantially reducing a communication privilege allowed a node of one sub-network of the plurality of sub-networks, wherein the node is operable to communicate after said implementing the malware countermeasure in the computing device, the implementing the malware countermeasure further including at least substantially reducing a functionality of the computing device, the reduced functionality including a restriction against performing a destructive writing operation, a blocking an application from running, and a forcing a user and/or an application to execute in a tighter security environment.

20. The method of claim 19, wherein the determining if a criterion is met for implementation of the malware countermeasure further includes:
determining if a criterion that includes receipt of an authorization to implement the countermeasure is met.

21. The method of claim 19, wherein the determining if a criterion is met for implementation of the malware countermeasure further includes:
determining if a criterion that includes an indicium of the malware being present in at least one of the network device, and/or in a node of the at least one sub-network of a plurality of sub-networks is met.

22. The method of claim 19, wherein the implementing the malware countermeasure in the computing device if the criterion is met for implementation of the malware countermeasure further includes:
applying the malware countermeasure to the computing device if the criterion is met for implementation of the malware countermeasure.

23. The method of claim 19, wherein the implementing the malware countermeasure in the computing device further includes:
implementing the malware countermeasure in the computing device, the implementing the malware countermeasure further including sending a notice receivable by a device associatable with a person, wherein sending the notice comprises sending an email to an email account associated with the person, and/or sending a text message to a portable wireless device carried by the person, and/or sending a recorded voice message to a telephone number designated by the person.

24. A network device comprising:
means for facilitating communication of a packet to at least one sub-network of a plurality of sub-networks;
means for generating a topological map to identify each respective node of a plurality of network nodes including the at least one sub-network of the plurality of sub-networks;
means for saving a countermeasure useable in at 'least substantially reducing a harm caused by a malware (hereafter the "malware countermeasure");
means for determining if a criterion is met for implementation of the malware countermeasure; and
means for implementing the malware countermeasure in the network device if the criterion for implementation of the malware countermeasure is met, the implementing the malware countermeasure including at least substantially reducing a communication privilege allowed a node of one sub-network of the plurality of sub-networks, wherein the node is operable to communicate after said implementing the malware countermeasure in the network device, the implementing the malware countermeasure further including at least substantially reducing a functionality of the network device, the reduced functionality including a restriction against performing a destructive writing operation, a blocking an application from running, and a forcing a user and/or an application to execute in a tighter security environment.

25. A computer-program product comprising:
(a) program instructions operable to perform a process in a computing device, the process comprising:
generating a topological map to identify each respective node of a plurality of network nodes including the at least one sub-network of the plurality of sub-networks;
saving a countermeasure useable in at least substantially reducing a harm presented by a malware (hereafter the "malware countermeasure") to a networked device and/or a node of a network;
determining if a criterion for implementation of the malware countermeasure is met; and
implementing the malware countermeasure in the computing device if the criterion is met for implementation of the malware countermeasure, the implementing the malware countermeasure including at least substantially reducing a communication privilege allowed a node of one sub-network of the plurality of sub-networks, wherein the node is operable to communicate after said implementing the malware countermeasure in the computing device, the implementing the malware countermeasure further including at least substantially reducing a functionality of the computing device, the reduced functionality including a restriction against performing a destructive writing operation, a blocking an application from running, and a forcing a user and/or an application to execute in a tighter security environment; and
(b) a non-transitory computer storage medium bearing the program instructions.

26. The computer-program product of claim 25, wherein the implementing the malware countermeasure in the network device further includes:
implementing the malware countermeasure in the computing device, the implementing the malware countermeasure further including sending a notice receivable by a device associatable with a person, wherein sending the notice comprises sending an email to an email account associated with the person, and/or sending a text message to a portable wireless device carried by the person, and/or sending a recorded voice message to a telephone number designated by the person.

27. A network device comprising: an information store configurable by a countermeasure useable in at least substantially reducing a harm caused by a malware (hereafter a "malware countermeasure");
a network analyzer coupled to the information store, the network analyzer module operable to generate a topological map to identify each respective node of a plurality of network nodes including at least one sub-network of a plurality of sub-networks;
a decision circuit for determining if a criterion for implementation of a malware countermeasure is met; and
a defender circuit for applying a malware countermeasure to the network device if the criterion for implementation of a malware countermeasure is met, the applying the malware countermeasure including at least substantially reducing a communication privilege allowed a node of the at least one sub-network of the plurality of sub-networks, wherein the node is operable to communicate after said implementing the malware countermeasure in the computing device, the implementing the malware countermeasure further including at least substantially reducing a functionality of the computing device, the reduced functionality including a restriction against performing a destructive writing operation, a blocking an application from running, and a forcing a user and/or an application to execute in a tighter security environment.

28. The network device of claim 27, wherein the decision circuit for determining if a criterion for implementation of a malware countermeasure is met further includes:
a decision circuit for determining if a criterion for implementation of a malware countermeasure is met and for selecting a malware countermeasure for application to the network device from among at least two malware countermeasures.

29. The network device of claim 28, wherein the defender circuit for applying a malware countermeasure to the network device if the criterion for implementation of a malware countermeasure is met further includes:
a defender circuit for applying the selected malware countermeasure to the network device.

30. The network device of claim 27, wherein the defender circuit for applying a malware countermeasure to the network device if the criterion for implementation of a malware countermeasure is met further includes:
a defender circuit for applying a malware countermeasure to the network device and for generating the malware countermeasure.

31. The network device of claim 27, wherein the defender circuit for applying a malware countermeasure to the network device if the criterion for implementation of a malware countermeasure is met further includes:
a defender circuit for applying a malware countermeasure to the network device, the application of the malware countermeasure includes at least one of:
closing at least one port of the network device;
at least substantially isolating the network device from a network;
at least substantially isolating at least one sub-network of the plurality subnetworks from the network device;
at least substantially isolating at least one node of a sub-network of the plurality sub-networks from the network device; and/at least substantially isolating a first sub-network of the plurality sub-networks from a second sub-network of the plurality sub-networks.

32. The network device of claim 27, wherein the defender circuit for applying a malware countermeasure to the network device if the criterion for implementation of a malware countermeasure is met further includes:
a defender circuit for applying a malware countermeasure to the network device, the application of the malware countermeasure includes at least one of:
at least substantially isolating at least two sub-networks of the plurality sub-networks from another network;
at least substantially isolating the network device from at least one network address of a sub-network of the plurality sub-networks;
at least substantially reducing a functionally of the network device; and/or
sending a notice receivable by a device associatable with a person associated of the network device.

33. The network device of claim 27, further comprising:
a transmission circuit for receiving a packet from a network and facilitate transmission of the packet to at least one sub-network of a plurality of sub-networks.

34. A method comprising: configuring an information store of a network device with a countermeasure useable in at least substantially reducing a harm caused by a malware (hereafter a "malware countermeasure");
generating a topological map to identify each respective node of a plurality of network nodes including at least one sub-network of a plurality of sub-networks;
determining if a criterion for implementation of a malware countermeasure is met; and
applying a malware countermeasure to the network device if the criterion for implementation of a malware countermeasure is met, the applying the malware countermeasure including at least substantially reducing a communication privilege allowed a node of the plurality of network nodes including the at least one sub-network of the plurality of sub-networks, wherein the node is operable to communicate after said implementing the malware countermeasure in the network device, the implementing the malware countermeasure further including at least substantially reducing a functionality of the network device, the reduced functionality including a restriction against performing a destructive writing operation, a blocking an application from running, and a forcing a user and/or an application to execute in a tighter security environment.

35. The method of claim 34, wherein the determining if a criterion for implementation of a malware countermeasure is met further includes:
determining if a criterion for implementation of a malware countermeasure is met and selecting a malware countermeasure for application to the network device from among at least two malware countermeasures.

36. A network device comprising: means for configuring an information store with a countermeasure useable in at least substantially reducing a harm caused by a malware (hereafter a "malware countermeasure");

means for generating a topological map to identify each respective node of a plurality of network nodes including the at least one sub-network of the plurality of sub-networks;

means for determining if a criterion for implementation of a malware countermeasure is met; and means for applying a malware countermeasure to the network device if the criterion for implementation of a malware countermeasure is met, the applying the malware countermeasure including at least substantially reducing a communication privilege allowed a node of the plurality of network nodes including the at least one sub-network of the plurality of sub-networks, wherein the node is operable to communicate after said implementing the malware countermeasure in the network device, the implementing the malware countermeasure further including at least substantially reducing a functionality of the network device, the reduced functionality including a restriction against performing a destructive writing operation, a blocking an application from running, and a forcing a user and/or an application to execute in a tighter security environment.

37. The network device of claim 36, wherein the means for determining if a criterion for implementation of a malware countermeasure is met further includes:

a means for selecting a malware countermeasure for application to the network device from among at least two malware countermeasures.

38. A network device comprising: an information store operable to save a countermeasure useable in at least substantially reducing a harm caused by a malware (hereinafter the "malware countermeasure");

a network analyzer operable to generate a topological map to identify each respective node of a plurality of network nodes including the at least one sub-network of the plurality of sub-networks;

a transmission circuit for sending a packet to at least one sub-network of a plurality of sub-networks; and a protection circuit for implementing the malware countermeasure in the network device, the implementing the malware countermeasure including at least substantially reducing a functionality of the network device, wherein the network device is operable to communicate after said implementing the malware countermeasure in the network device, the implementing the malware countermeasure further including at least substantially reducing a functionality of the network device, the reduced functionality including a restriction against performing a destructive writing operation, and, a blocking an application from running, and a forcing a user and/or an application to execute in a tighter security environment.

39. The network device of claim 38, further comprising:

a decision circuit for determining if a criterion is met for implementation of the malware countermeasure.

40. The network device of claim 39, wherein the decision circuit for determining if a criterion is met for implementation of the malware countermeasure further includes:

a decision circuit for determining if an authorization to implement the countermeasure has been received.

41. The network device of claim 39, wherein the decision circuit for determining if the criterion is met for implementation of the malware countermeasure further includes:

a decision circuit for determining if a presence of the malware is indicated.

42. The network device of claim 39, wherein the decision circuit for determining if the criterion is met for implementation of the malware countermeasure further includes:

a decision circuit for determining if an indicium of the malware is present in at least one of the network device, and/or in a node of the at least on sub-network of a plurality of sub-networks.

* * * * *

UNITED STATES PATENT AND TRADEMARK OFFICE
CERTIFICATE OF CORRECTION

PATENT NO. : 8,117,654 B2  
APPLICATION NO. : 11/480819  
DATED : February 14, 2012  
INVENTOR(S) : Jung et al.

Page 1 of 1

It is certified that error appears in the above-identified patent and that said Letters Patent is hereby corrected as shown below:

In the Claims

Claim 24, Column 24, Line 18 please replace "at 'least" with -- at least --

Claim 31, Column 26, Line 8 please replace "and/" with -- and --

Signed and Sealed this  
Second Day of July, 2013

Teresa Stanek Rea  
*Acting Director of the United States Patent and Trademark Office*